United States Patent
Gole et al.

(10) Patent No.: US 11,816,359 B2
(45) Date of Patent: Nov. 14, 2023

(54) SCALABLE SOLID-STATE STORAGE SYSTEM AND METHODS THEREOF

(71) Applicant: NETAPP, INC., San Jose, CA (US)

(72) Inventors: Abhijeet Prakash Gole, Cupertino, CA (US); Timothy K. Emami, San Jose, CA (US)

(73) Assignee: NETAPP, INC., San Jose, CA (US)

( * ) Notice: Subject to any disclaimer, the term of this patent is extended or adjusted under 35 U.S.C. 154(b) by 0 days.

(21) Appl. No.: 17/650,936

(22) Filed: Feb. 14, 2022

(65) Prior Publication Data
US 2023/0195382 A1    Jun. 22, 2023

Related U.S. Application Data

(60) Provisional application No. 63/290,549, filed on Dec. 16, 2021.

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/067* (2013.01); *G06F 3/0617* (2013.01); *G06F 3/0631* (2013.01); *G06F 3/0688* (2013.01)

(58) Field of Classification Search
CPC .... G06F 3/0659; G06F 3/0604; G06F 3/0617; G06F 3/0631; G06F 3/0688
See application file for complete search history.

(56) References Cited

U.S. PATENT DOCUMENTS

| | | | |
|---|---|---|---|
| 5,664,187 | A | 9/1997 | Burkes et al. |
| 6,101,615 | A | 8/2000 | Lyons |
| 8,074,021 | B1 | 12/2011 | Miller et al. |
| 8,463,991 | B2 | 6/2013 | Colgrove et al. |
| 8,549,222 | B1 | 10/2013 | Kleiman et al. |

(Continued)

FOREIGN PATENT DOCUMENTS

EP    1343087 A2    9/2003

OTHER PUBLICATIONS

Non-Final Office Action on co-pending (U.S. Appl. No. 17/650,940) dated Feb. 16, 2023.

(Continued)

*Primary Examiner* — John A Lane
(74) *Attorney, Agent, or Firm* — LOZA & LOZA, LLP; Tejinder Singh

(57) ABSTRACT

Methods and systems for solid state drives are provided, including assigning a first namespace to a first instance of a storage operating system and a second instance of the storage operating system for enabling read access to a first portion of a flash storage system by the first instance, and read and write access to the second instance; allocating a second namespace to the first instance for exclusive read and write access within a second portion of the flash storage system; generating, by the first instance, a request for the second instance to transfer a data object from the second portion owned by the first instance to the first portion; storing, by the second instance, the data object at the first portion; and updating metadata of the data object at the second portion, the metadata indicating a storage location at the second portion where the data object is stored.

20 Claims, 17 Drawing Sheets

(56) References Cited

U.S. PATENT DOCUMENTS

| | | | |
|---|---|---|---|
| 8,775,868 | B2 | 7/2014 | Colgrove et al. |
| 8,832,373 | B2 | 9/2014 | Colgrove et al. |
| 8,850,108 | B1 | 9/2014 | Hayes et al. |
| 8,862,820 | B2 | 10/2014 | Colgrove et al. |
| 9,003,144 | B1 | 4/2015 | Hayes et al. |
| 9,021,297 | B1 | 4/2015 | Hayes et al. |
| 9,134,917 | B2 | 9/2015 | Kimmel et al. |
| 9,201,600 | B1 | 12/2015 | Hayes et al. |
| 9,218,244 | B1 | 12/2015 | Hayes et al. |
| 9,229,808 | B2 | 1/2016 | Colgrove et al. |
| 9,244,769 | B2 | 1/2016 | Colgrove et al. |
| 9,367,243 | B1 | 6/2016 | Hayes et al. |
| 9,483,346 | B2 | 11/2016 | Davis et al. |
| 9,495,255 | B2 | 11/2016 | Davis et al. |
| 9,525,738 | B2 | 12/2016 | Hayes et al. |
| 9,563,506 | B2 | 2/2017 | Hayes et al. |
| 9,588,842 | B1 | 3/2017 | Sanvido et al. |
| 9,594,633 | B2 | 3/2017 | Colgrove et al. |
| 9,672,125 | B2 | 6/2017 | Botes et al. |
| 9,672,905 | B1 | 6/2017 | Gold et al. |
| 9,798,477 | B2 | 10/2017 | Botes et al. |
| 9,880,899 | B2 | 1/2018 | Davis et al. |
| 9,934,089 | B2 | 4/2018 | Hayes et al. |
| 9,967,342 | B2 | 5/2018 | Colgrove et al. |
| 10,095,701 | B1 | 10/2018 | Faibish et al. |
| 10,180,879 | B1 | 1/2019 | Colgrove et al. |
| 10,248,516 | B1 | 4/2019 | Sanvido et al. |
| 10,303,547 | B2 | 5/2019 | Hayes et al. |
| 10,353,777 | B2 | 7/2019 | Bernat et al. |
| 10,372,506 | B2 | 8/2019 | Baptist et al. |
| 10,379,763 | B2 | 8/2019 | Colgrove et al. |
| 10,387,247 | B2 | 8/2019 | Baptist et al. |
| 10,387,250 | B2 | 8/2019 | Resch et al. |
| 10,387,256 | B2 | 8/2019 | Dhuse et al. |
| 10,402,266 | B1 | 9/2019 | Kirkpatrick et al. |
| 10,417,092 | B2 | 9/2019 | Brennan et al. |
| 10,432,233 | B1 | 10/2019 | Colgrove et al. |
| 10,437,673 | B2 | 10/2019 | Baptist et al. |
| 10,437,678 | B2 | 10/2019 | Resch |
| 10,452,289 | B1 | 10/2019 | Colgrove et al. |
| 10,467,107 | B1 | 11/2019 | Abrol et al. |
| 10,489,256 | B2 | 11/2019 | Hayes et al. |
| 10,503,598 | B2 | 12/2019 | Trichardt et al. |
| 10,521,120 | B1 | 12/2019 | Miller et al. |
| 10,530,862 | B2 | 1/2020 | Isely et al. |
| 10,534,661 | B2 | 1/2020 | Resch |
| 10,572,176 | B2 | 2/2020 | Davis et al. |
| 10,579,450 | B2 | 3/2020 | Khadiwala et al. |
| 10,606,700 | B2 | 3/2020 | Alnafoosi et al. |
| 10,613,974 | B2 | 4/2020 | Dreier et al. |
| 10,656,871 | B2 | 5/2020 | Peake |
| 10,657,000 | B2 | 5/2020 | Resch |
| 10,671,480 | B2 | 6/2020 | Hayes et al. |
| RE48,222 | E | 9/2020 | Colgrove et al. |
| 10,776,204 | B2 | 9/2020 | Resch et al. |
| 10,810,083 | B1 | 10/2020 | Colgrove et al. |
| 10,817,375 | B2 | 10/2020 | Colgrove et al. |
| 10,838,834 | B1 | 11/2020 | Sanvido et al. |
| 10,860,424 | B1 | 12/2020 | Dhuse et al. |
| 10,891,192 | B1 | 1/2021 | Brennan et al. |
| RE48,448 | E | 2/2021 | Colgrove et al. |
| 11,269,778 | B1 | 3/2022 | Kanteti |
| 11,340,987 | B1 | 5/2022 | Gole et al. |
| 11,442,646 | B2 | 9/2022 | Agarwal |
| 11,698,836 | B2 | 7/2023 | Gole et al. |
| 2006/0129873 | A1 | 6/2006 | Hafner et al. |
| 2006/0242539 | A1 | 10/2006 | Kang et al. |
| 2010/0332401 | A1 | 12/2010 | Prahlad et al. |
| 2012/0084506 | A1 | 4/2012 | Colgrove et al. |
| 2012/0151118 | A1 | 6/2012 | Flynn et al. |
| 2014/0281227 | A1 | 9/2014 | Herron et al. |
| 2015/0169244 | A1 | 6/2015 | Asnaashari et al. |
| 2015/0199151 | A1 | 7/2015 | Klemm et al. |
| 2016/0313943 | A1 | 10/2016 | Hashimoto et al. |
| 2016/0342470 | A1 | 11/2016 | Cudak et al. |
| 2017/0124345 | A1 | 5/2017 | Christiansen et al. |
| 2017/0220264 | A1 | 8/2017 | Sokolov et al. |
| 2019/0004964 | A1 | 1/2019 | Kanno |
| 2019/0018788 | A1 | 1/2019 | Yoshida et al. |
| 2019/0278663 | A1 | 9/2019 | Mehta et al. |
| 2020/0089407 | A1* | 3/2020 | Baca .................. G06F 3/0635 |
| 2020/0394112 | A1 | 12/2020 | Gupta et al. |
| 2020/0409589 | A1 | 12/2020 | Bennett et al. |
| 2020/0409601 | A1 | 12/2020 | Helmick et al. |
| 2021/0081273 | A1 | 3/2021 | Helmick et al. |
| 2021/0081330 | A1 | 3/2021 | Bennett et al. |
| 2021/0132827 | A1 | 5/2021 | Helmick et al. |
| 2021/0303188 | A1 | 9/2021 | Bazarsky et al. |
| 2021/0334006 | A1 | 10/2021 | Singh et al. |
| 2022/0027051 | A1* | 1/2022 | Kant .................. G06F 3/0605 |
| 2022/0137844 | A1 | 5/2022 | Goss et al. |
| 2022/0197553 | A1 | 6/2022 | Benhanokh et al. |
| 2022/0229596 | A1 | 7/2022 | Jung |
| 2022/0244869 | A1 | 8/2022 | Kanteti |
| 2022/0283900 | A1 | 9/2022 | Gole et al. |
| 2022/0291838 | A1 | 9/2022 | Gorobets et al. |
| 2023/0082636 | A1 | 3/2023 | Zhu et al. |
| 2023/0107466 | A1 | 4/2023 | Gole |

OTHER PUBLICATIONS

European Search Report for Application No. EP22157793 dated Jul. 19, 2022, 16 pages.

Non-Final Office Action dated Mar. 30, 2023 for U.S. Appl. No. 17/494,684, filed Oct. 5, 2021, 8 pages.

International Preliminary Report on Patentability for Application No. PCT/US2021/028879, dated Oct. 25, 2022, 6 pages.

International Search Report and Written Opinion for International Application No. PCT/US2021/028879, dated Aug. 5, 2021, 8 pages.

Mao B., et al., "HPDA: A Hybrid Parity-Based Disk Array for Enhanced Performance and Reliability," Retrieved from Internet URL: https://www.researchgate.net/publication/224140602, May 2020; 13 pages.

Notice of Allowance on co-pending (U.S. Appl. No. 17/727,511) dated Dec. 14, 2022.

Notice of Allowance on co-pending (U.S. Appl. No. 16/858,019) dated Dec. 20, 2022.

Dholakia A., et al., "A New Intra-disk Redundancy Scheme for High-Reliability RAID Storage Systems in the Presence of Unrecoverable Errors," ACM Transactions on Storage, May 2008, vol. 4 (1), Article 1, 42 pages.

Miao, B., et al.,"HPDA: a Hybrid Parity-Based Disk Array for Enhanced Performance and reliability," ACM Transactions on Storage (TOS), vol. 8, No. 1, Publication [online], Feb. 2012 [retrieved Apr. 4, 2016). Retrieved from the Internet: URL: http://or.nsfc.gov.en/bitstream/00001903-5/90177/1/1000003549834.pdf, pp. 4.1-4.20.

NetApp, Inc., "Data ONTAP®7 .3 Data Protection Online Backup and Recovery Guide," Feb. 22, 2011, Part No. 210-05212_A0, 432 pages.

NetApp, Inc., "Data ONTAP®7.3 Active/Active Configuration Guide," Jun. 16, 2011, Part No. 210-05247_A0, 214 pages.

NetApp, Inc., "Data ONTAP®7.3 Archive and Compliance Management Guide," Mar. 4, 2010, Part No. 210-04827_A0, 180 pages.

NetApp, Inc., "Data ONTAP®7.3 Block Access Management Guide for iSCSI and FC," Mar. 4, 2010, Part No. 210-04752_B0, 202 pages.

NetApp, Inc., "Data ONTAP®7.3 Data Protection Tape Backup and Recovery Guide," Jan. 15, 2010, Part No. 210-04762_A0, 142 pages.

NetApp, Inc., "Data ONTAP®7.3 Documentation Roadmap," Jul. 9, 2008, Part No. 210-04229_A0, 8 pages.

NetApp, Inc., "Data ONTAP®7.3 File Access and Protocols Management Guide," Sep. 10, 2009, Part No. 210-04505_B0, 382 pages.

NetApp, Inc., "Data ONTAP®7.3 MultiStore Management Guide," Mar. 4, 2010, Part No. 210-04855_A0, 144 pages.

NetApp, Inc., "Data ONTAP®7.3 Network Management Guide," Jan. 15, 2010, Part No. 210-04757_A0, 222 pages.

(56) References Cited

OTHER PUBLICATIONS

NetApp, Inc., "Data ONTAP®7.3 Software Setup Guide," Nov. 4, 2010, Part No. 210-05045_A0, 116 pages.
NetApp, Inc., "Data ONTAP®7.3 Storage Efficiency Management Guide," Mar. 4, 2010, Part No. 210-04856_A0, 76 pages.
NetApp, Inc., "Data ONTAP®7.3 Storage Management Guide," May 3, 2012, Part No. 210-04766_B0, 356 pages.
NetApp, Inc., "Data ONTAP®7.3 System Administration Guide," Nov. 11, 2010, Part No. 210-05043_A0, 350 pages.
NetApp, Inc., "Data ONTAP®7.3 Upgrade Guide," Nov. 11, 2010, Part No. 210-05042_A0, 200 pages.
NetApp, Inc., "Data ONTAP®7.3.7 Release Notes," May 31, 2012, Part No. 215-06916_A0, 182 pages.
NetApp, Inc., "Date ONTAP®7.3 Core Commands Quick Reference," Jun. 2008, Part No. 215-03893_A0, 1 page.
NetApp, Inc., "Notices," 2010, Part No. 215-05705_A0, 46 pages.
NetApp, Inc., "V-Series Systems Hardware Maintenance Guide," Jul. 2006, Part No. 210-00975_A0, 202 pages.
NetApp, Inc., "V-Series Systems Implementation Guide for Hitachi® Storage," Dec. 2009, Part No. 210-04694_A0, 66 pages.
NetApp, Inc., "V-Series Systems Installation Requirements and Reference Guide," Oct. 2010, Part No. 210-05064_A0, 214 pages.
NetApp, Inc., "V-Series Systems MetroCiuster Guide," Jul. 2009, Part No. 210-04515_A0, 80 pages.
NVM Express Base Specification; Mar. 9, 2020; Revision 1.4a; NVM Express Workgroup; 405 pages.
Notice of Allowance on co-pending (U.S. Appl. No. 17/192,606) dated Jan. 28, 2022.
International Search Report and Written Opinion, International Patent Application No. PCT/US2022/049431, dated Mar. 3, 2023, 13 pgs.
Notice of Allowance dated Jun. 16, 2023 for U.S. Appl. No. 16/858,019, filed Apr. 24, 2020, 10 pages.
Notice of Allowance dated Jun. 26, 2023 for U.S. Appl. No. 17/494,684, filed Oct. 5, 2021, 8 pages.
Co-pending U.S. Appl. No. 17/456,012, inventors Doucette; Douglas P. et al., filed Nov. 22, 2021.
Co-pending U.S. Appl. No. 17/650,940, inventors Gole; Abhijeet Prakash et al., filed Feb. 14, 2022.
Notice of Allowance dated Mar. 1, 2023 for U.S. Appl. No. 17/727,511, filed Apr. 22, 2022, 15 pages.
Non-Final Office Action for Co-pending U.S. Appl. No. 17/456,012 dated Apr. 18, 2023.
Notice of Allowance dated Jul. 19, 2023 for U.S. Application No. 17/650,940, filed Feb. 14, 2022, 9 pages.
Notice of Allowance dated Aug. 30, 2023 for U.S. Appl. No. 17/456,012, filed Nov. 22, 2021, 10 pages.

\* cited by examiner

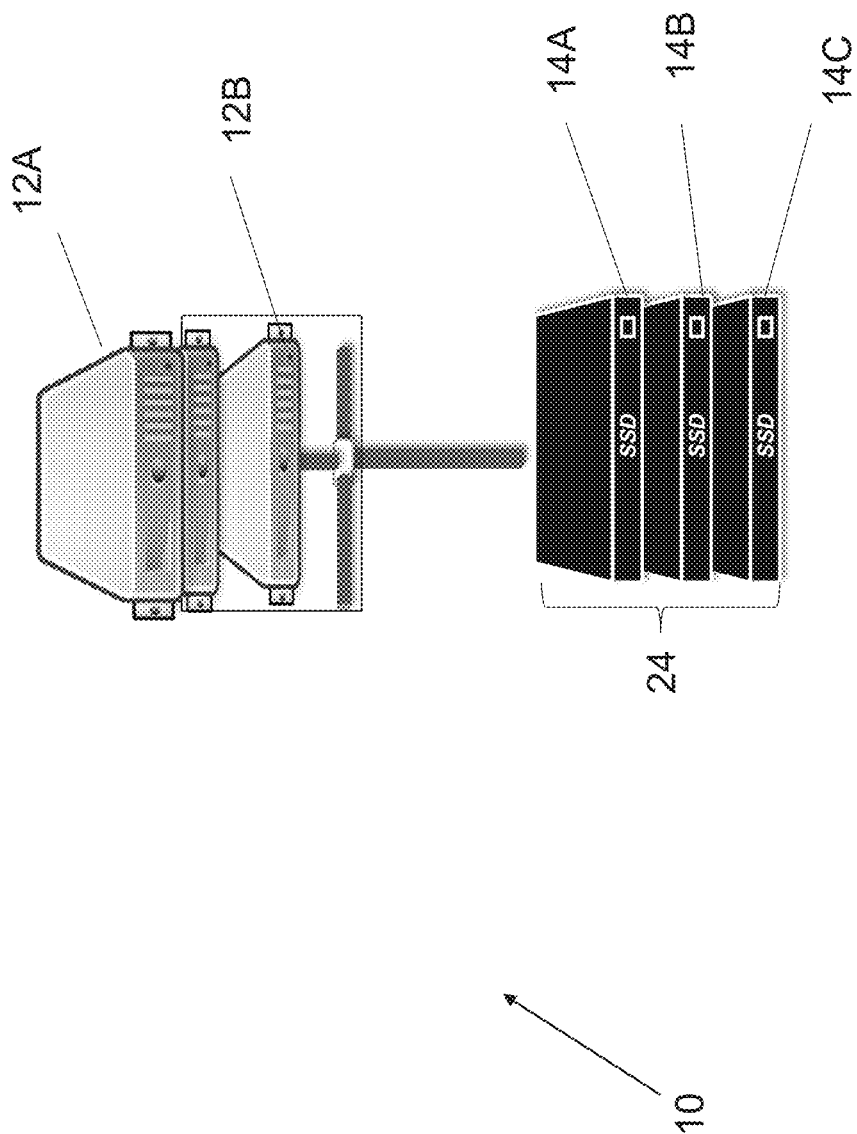

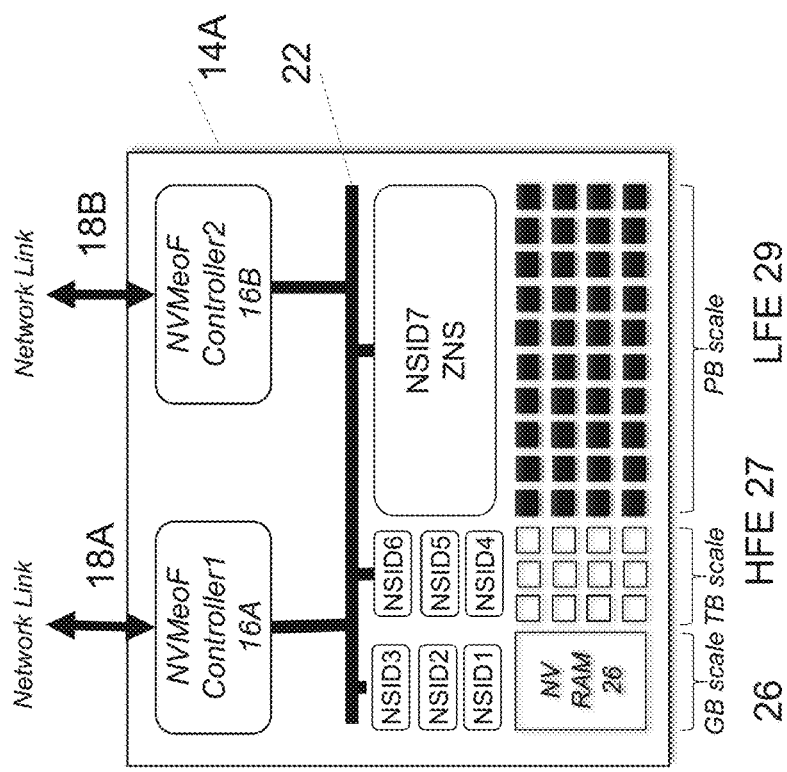
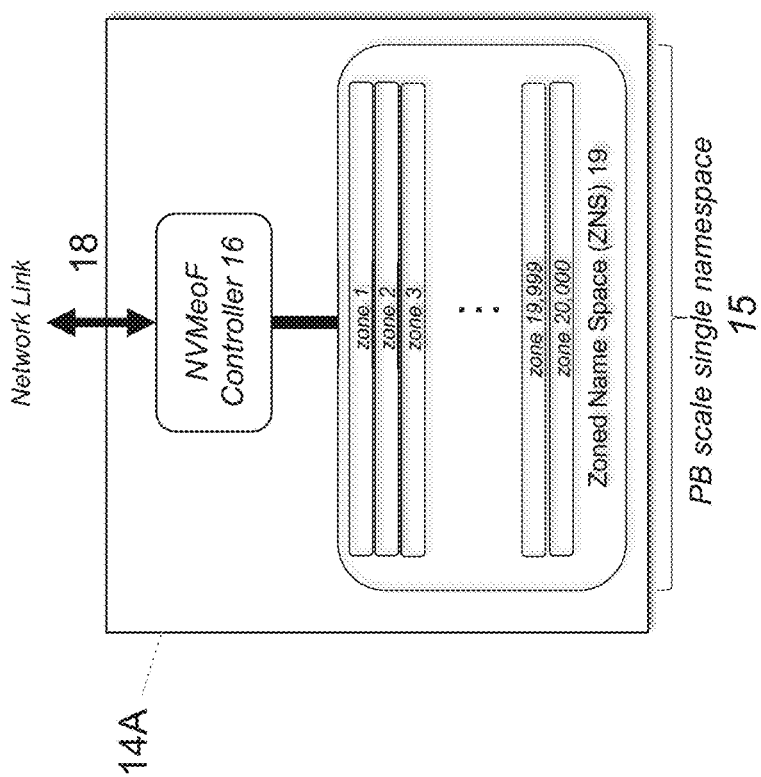
FIG. 1B

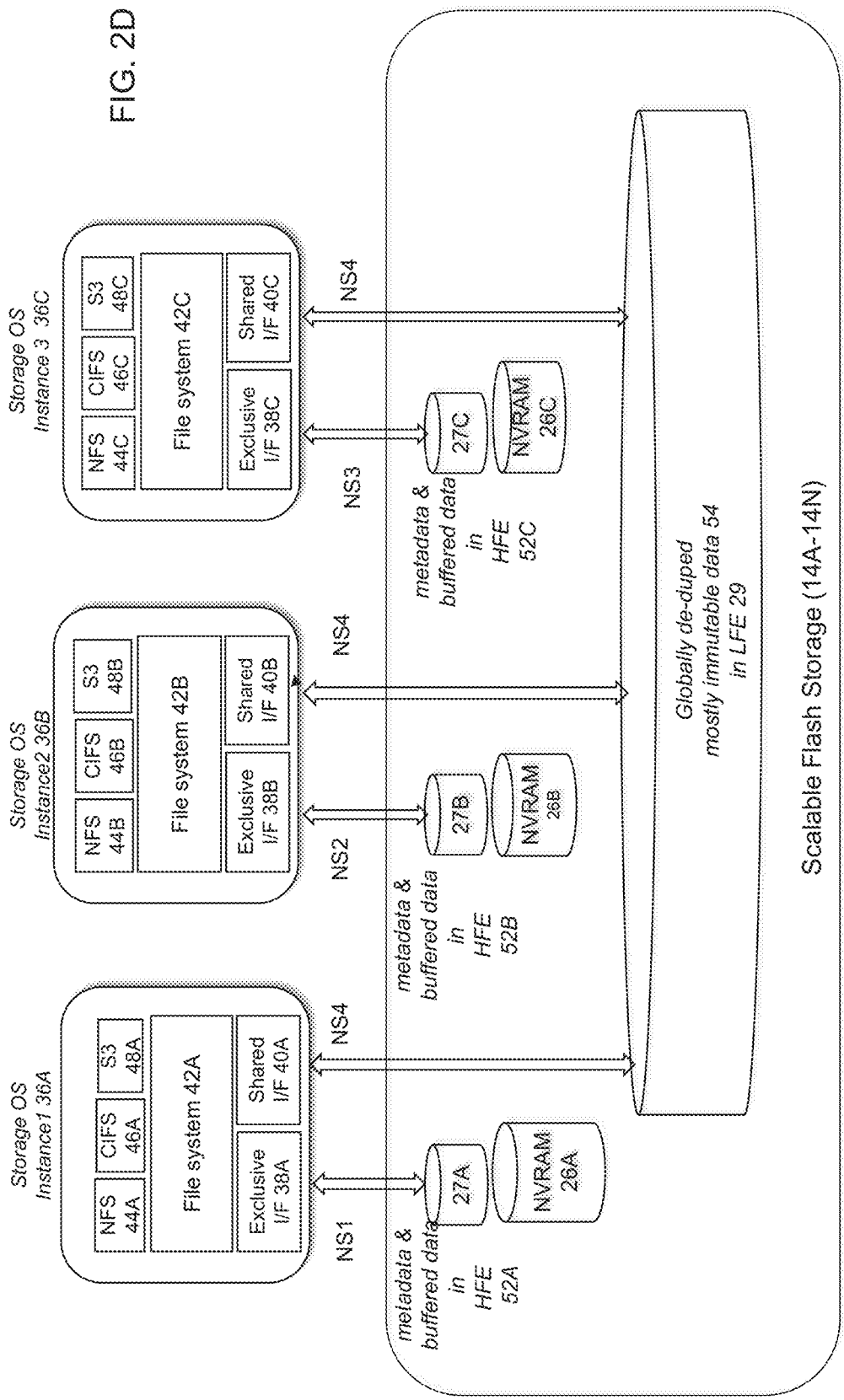

SCALABLE SOLID-STATE STORAGE SYSTEM AND METHODS THEREOF

CROSS-REFERENCE TO RELATED APPLICATION

This patent application claims priority under 35 USC § 119(e) to US Provisional Patent Application, entitled "SCALABLE SOLID-STATE STORAGE SYSTEM AND METHODS THEREOF", Ser. No. 63/290,549 filed on Dec. 16, 2021, the disclosure of which is incorporated herein by reference in its entirety.

TECHNICAL FIELD

The present disclosure relates to storage systems and more particularly, to scalable, zoned namespace, solid-state storage for a networked storage system.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices operating in a group of a storage sub-system. The storage devices (may also be referred to as "disks") within a storage system are typically organized as one or more groups (or arrays), wherein each group is operated as a RAID (Redundant Array of Inexpensive Disks).

Applications that store and access data continue to evolve. For example, media, entertainment, and other types of applications need to efficiently store and retrieve data, e.g., for content/video streaming. Data can be stored as files and objects rather than blocks. Most stored data are immutable and, based on data lifecycle, may be stored for a long duration. The data lifecycle may begin as "hot," which means initially data access and read frequency is high. Then as time progresses data becomes "warm" with lower access frequency than hot data. Eventually, the data may become "cold" data that is rarely accessed and changed.

Conventional all flash arrays (i.e., storage arrays with all solid-state drives ("SSDs") are expensive. Traditional hard-drive systems are not able to meet the performance requirements to access stored data by these media applications because data cannot be stored or retrieved quickly enough. Continuous efforts are being made to develop technology for providing scalable storage solutions with reasonable cost of ownership with an optimum mix of processing, memory and storage ability to store and access data efficiently for evolving application needs.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures:

FIG. 1A shows a block diagram of a system with scalable, zoned solid-state drives ("ZNS SSDs"), according to one aspect of the present disclosure;

FIG. 1B shows a high-level block diagram of an architecture for a ZNS SSD, according to one aspect of the present disclosure;

FIG. 2D shows an example of a scalable flash architecture, according to one aspect of the present disclosure;

FIG. 2I shows a process flow for using a scalable ZNS SSD architecture, according to one aspect of the present disclosure;

DETAILED DESCRIPTION

Figure 1C:
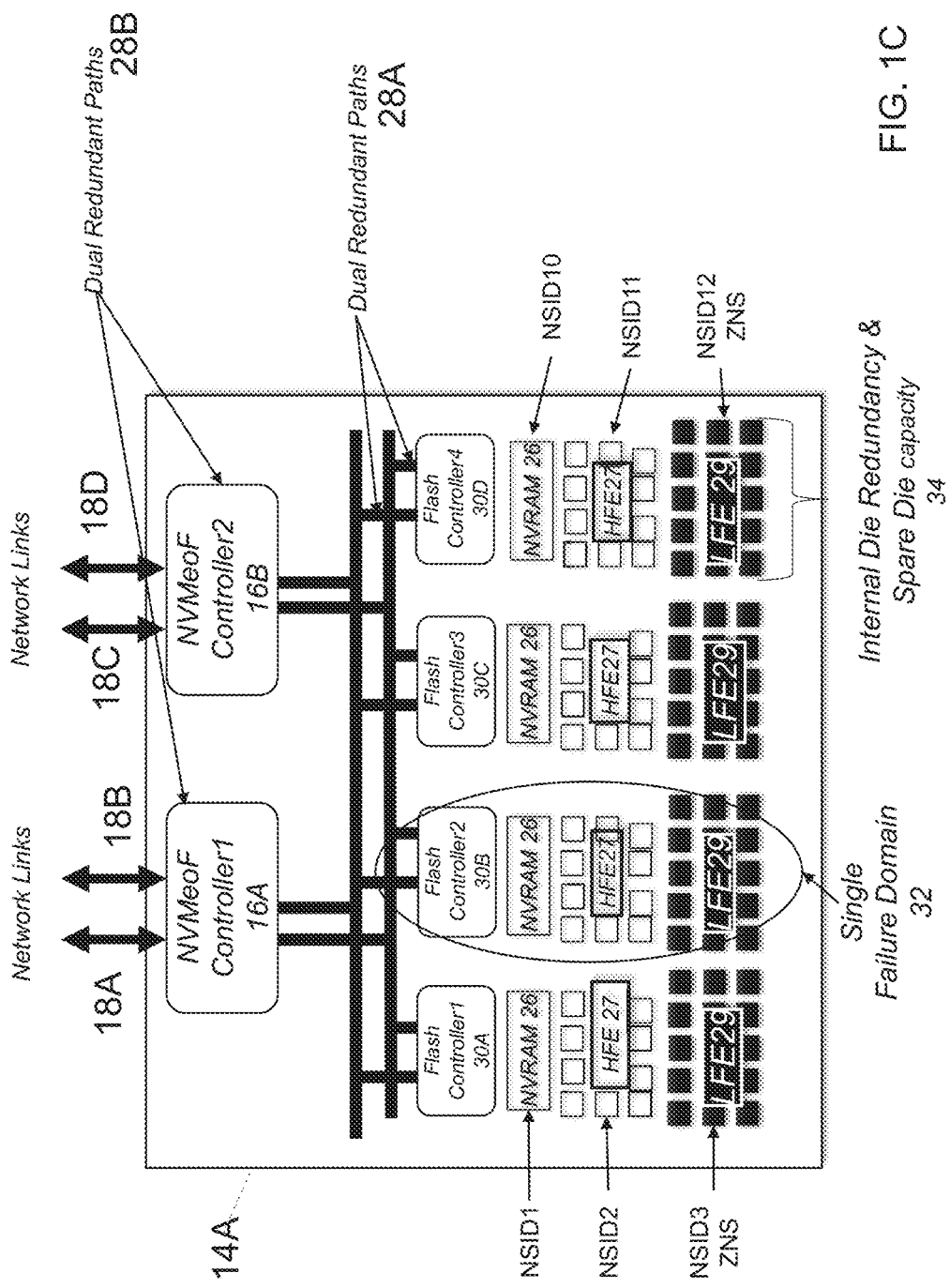
FIG. 1C shows an example of using a ZNS SSD with redundancy, according to one aspect of the present disclosure.

As a preliminary note, the terms "component", "module", "system," and the like as used herein are intended to refer to a computer-related entity, either software-executing general-purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, storage class memory, solid state drive, EEPROM (electrically erasable programmable read only memory), memory stick or any other storage device type, in accordance with the claimed subject matter.

In one aspect, innovative technology is provided for high capacity (e.g., in peta-bytes ("PB")) storage devices that can be scaled up or down based on storage needs, independent of compute/memory that may be used for executing a storage operating system. FIG. 1A shows an example of a system 10 with compute nodes 12A/12B that access scalable storage devices 14A-14C (may also be referred to as storage device 14 or storage devices 14 as well as PB SSD 14 or PB SSDs 14), collectively shown as 24. It is noteworthy that although three storage devices are shown in system 10, the adaptive aspects of the present disclosure are not limited to 3 devices and instead may have "N" devices, hence the term storage devices 14A-14N, as used herein. Each compute/memory node 12A/12B can be scaled up or down based on computing needs. Storage capacity can be added or reduced by adding or removing one or more storage device 14.

As an example, the storage devices 14 include zoned namespace solid state drives ("ZNS SSDs"). In one aspect, ZNS SSDs comply with the NVMe (Non-Volatile Memory Host Controller Interface) zoned namespace (ZNS) specification defined by the NVM Express® (NVMe®) standard organization. A "zone" as defined by the NVMe ZNS standard is a sequence of blocks that are written in a sequential fashion and are overwritten by performing a "Zone Erase" or "Zone Reset operation" per the NVMe specification. Storage space at each ZNS SSD is exposed as zones, e.g., physical zones ("PZones") and RAID zones ("RZones"), each RAID zone having a plurality of PZones. The RZones are presented to software layers that interface with a file system to process read and write requests.

Conventional SSD systems face various challenges when it comes to shared SSD storage. For example, in a cluster-based storage system with multiple cluster storage nodes that provide access to storage, managing shared free space across clusters or shared file system metadata can be difficult, especially for a single multi core system. It is also difficult to implement distributed RAID on shared SSDs because it can be difficult to coordinate background RAID processing between multiple cluster nodes, as well as determining which node will respond to errors. In one aspect, as described below in detail, the technology disclosed herein solves various technical challenges that face conventional storage operating systems.

FIG. 1B shows an example of storage device 14A, according to one aspect of the present disclosure. The storage device 14A is accessible via a network connection (e.g., Ethernet) 18 and a NVMeoF (NVMe over Fabric) controller 16. The NVMeoF protocol is an extension of the NVMe protocol that uses network protocols. e.g., Ethernet and Fibre Channel for delivering faster and more efficient connectivity between storage devices and servers.

In one aspect, the storage space at multiple PB SSDs 14A-14N can be presented as a PB scale single namespace 15. In NVMe® technology, a namespace is a collection of logical block addresses (LBA) accessible to a software layer, e.g., a storage operating system instance. A namespace identifier ("NSID" or "NS") is an identifier used by a NVMe controller (e.g., 16) to provide access to a namespace. A namespace is typically not a physical isolation of blocks, rather involves isolation of addressable logical blocks. The innovative technology disclosed herein uses conventional namespace (referred to as "CNS" in the specification and some of the Figures) to provide exclusive access to one storage operating system instance, and ZNS 19 (e.g., having zone 1-zone 20,000) to provide shared access to multiple storage operating system instances, as described below in detail. CNS in this context, as used herein, refers to a contiguous range of blocks which are randomly read/writable, whereas ZNS is a collection of zones where a zone is a range of blocks that can be randomly read, but written sequentially per the NVMe ZNS standard.

FIG. 1B further shows a logical configuration of storage device 14A for reducing the overall cost of storage and efficiently add or decrease storage capacity, as needed, according to one aspect of the present disclosure. As an example, the storage device 14A may include different storage media types, e.g., a non-volatile, dynamic random-access memory (NVRAM) 26, high endurance flash (referred to as "HFE" e.g., triple-layer-cell SSDs (TLC)) or SCM (storage class memory) 27 and low endurance flash (referred to as "LFE," e.g., quad-layer cell (QLC) SSDs 29 (also referred to as PB scale SSDs). The various storage devices enable a storage operating system to configure and manage storage at a giga-byte (GB) level, terra-byte (TB) level and PB (peta-byte) level using the different types of storage media. For example, if a system needs more PB scale storage, then a LFE (e.g., QLC type SSD) is simply added to provide PB scale storage. If the system needs more NVRAM or HFE (e.g., TLC type SSDs) to store hot data, then TLC type storage can be added to the storage device 14A. The storage scaling up or down is independent of compute/memory nodes 12A/12B. It is noteworthy that although the description below refers to SCM, TLC 27 and QLC 29 as examples of HFE and LFE, the various aspects of the present disclosure are not limited to SCM, TLC and/or QLC type storage.

Storage space at various media types can be accessed via multiple namespaces shown as NSID1-NSID7. NSIDs 1-6 are configured to access the NVRAM 26 and HFE 27 type storage. NSID-16 provide exclusive access to NVRAM 26 and HFE 27 to various storage operating system instances, as described below in detail. NSID7 provides shared access to LFE, i.e., PB scale storage 29, also described below in detail.

Multiple NVMeoF controllers 16A-16B can read and write data via an interconnect 22 for requests received via network connections 18A/18B. As an example, interconnect 22 is an abstraction that represents any one or more separate physical buses and/or point-to-point connections, connected by appropriate bridges, adapters and/or controllers. Interconnect 22, therefore, may include, for example, a system bus, a Peripheral Component Interconnect (PCI) Express (PCIe) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

FIG. 1C shows another example of storage device 14A with built-in redundancy to handle one or more failure domains. The storage device 14A in this example includes redundant components e.g., multiple network links 18A-18D, NVMeoF controllers 16A/16B, and multiple flash controllers 30A-30D that access NVRAM 26, HFE 27 and LFE 29 type storage using NSIDs1-12, where NSID3 and NSID 12 are used for shared access using ZNS while NSID1-2 and NSID 34-11 are used for exclusive access at NVRAM 26 and HFE 27 type storage. Reference number 28A refers to a redundant fabric, while reference number 28B shows a pair of NVMeoF controllers.

As an example, data is stored redundantly across failure domains such that a single failure (e.g., 32) will not cause loss of data access because spare storage capacity, shown as 34, can be used to store data from the failed domain. If a network link (e.g., 18A) fails, then another network link (e.g., 18B) can be used to access storage. If one of the NVMeoF controller (e.g., 16A) fails, then the other controller (e.g., 16B) can be used to access the underlying storage using the assigned namespaces.

Figure 1D:
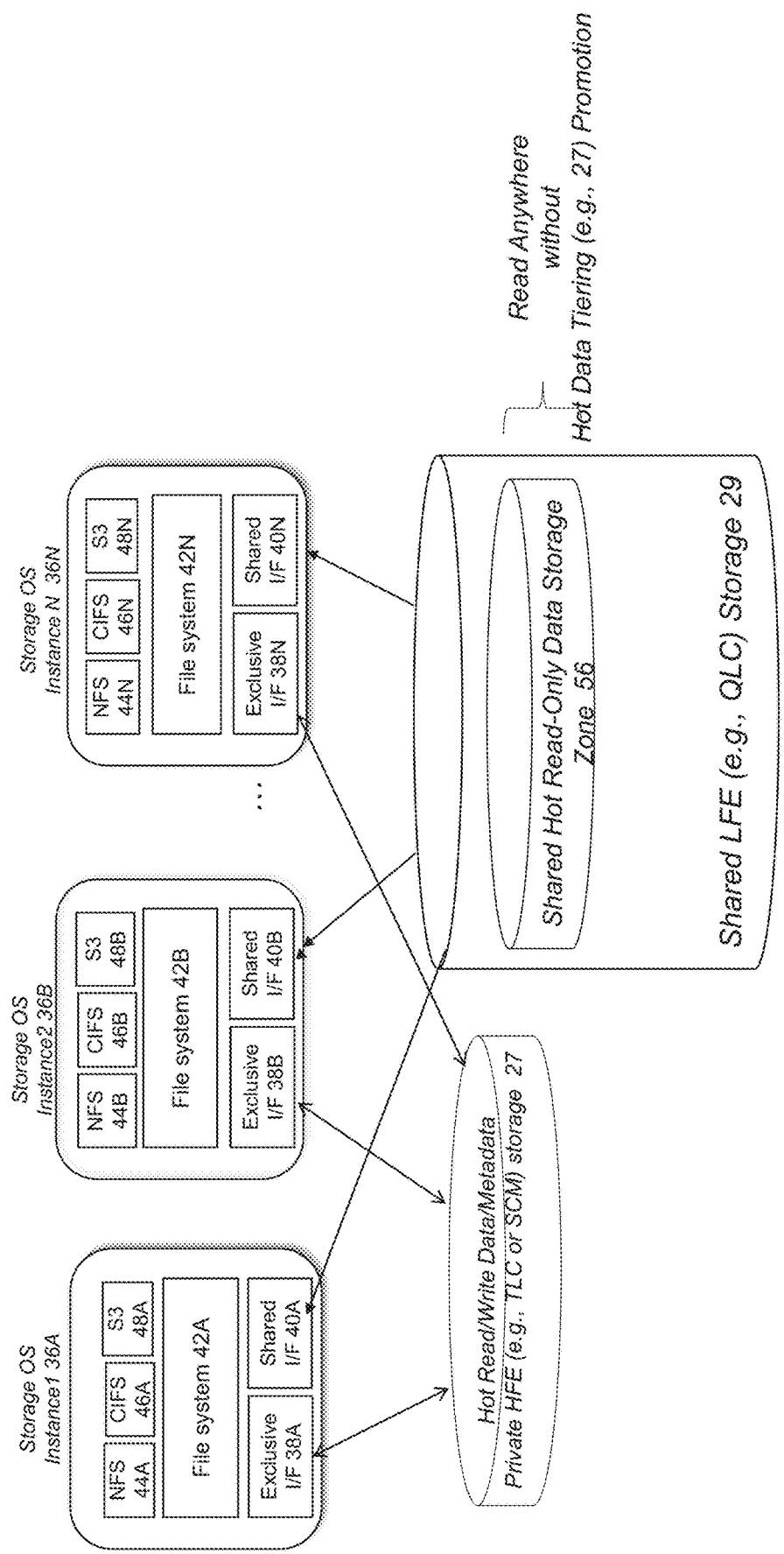
FIG. 1D shows an example of using shared namespace and exclusive namespace to access a plurality of ZNS SSDs, according to one aspect of the present disclosure.

FIG. 1D shows an example configuration of using one or more storage devices 14A-14N by a plurality of storage operating system instances 36A-36N (may also be referred to as storage operating system instance 36 or storage operating system instances 36). A storage operating system instance 36 in this context means a virtual machine executing an instance of a storage operating system, a cloud-based container or a micro-service executing an instance of the storage operating system. As an example, each storage operating system instance 36 may include several modules, or "layers". These layers include a file system (may also be referred to as file system manager) 42A-42N (may also be referred to as file system 42) that keeps track of a directory structure (hierarchy) of the data stored in storage devices 14 and manages read/write operations, i.e., executes read/write operations on storage devices 14 in response to read/write requests.

The file system 42 uses logical storage objects (e.g., a storage volume, a logical unit number (LUN) or any other logical object) to store information and retrieve information. The storage space at the storage devices (e.g., HFE 27 and LFE 29) is represented by one or more "aggregates," and within each aggregate one or more storage volumes/LUNs are created. Each storage system instance has access to one or more aggregates to store and retrieve information i.e., the storage system instance owns the "storage." To store and retrieve information, a computing device, typically issues write and/or read requests. Based on the request type (i.e., write or read request), the storage operating system instance 36 stores information at the storage space within one or more aggregate or retrieves information.

The file system 42 logically organizes stored information as a hierarchical structure for stored files/directories/objects. Each "on-disk" file may be implemented as a set of data blocks configured to store information, such as text, whereas a directory may be implemented as a specially formatted file in which other files and directories are stored. The data blocks are organized within a volume block number (VBN) space that is maintained by the file system. The file system may also assign each data block in the file a corresponding "file offset" or file block number (FBN). The file system typically assigns sequences of FBNs on a per-file basis, whereas VBNs are assigned over a larger volume address space. The file system organizes the data blocks within the VBN space as a logical volume. The file system typically consists of a contiguous range of VBNs from zero to n, for a file system of size n−1 blocks.

As an example, the file system uses an inode, a data structure, to store information, such as metadata, about a file, whereas the data blocks are structures used to store the actual data for the file. The information in an inode may include, e.g., ownership of the file, file modification time, access permission for the file, size of the file, file type and references to locations of the data blocks for the file. The references to the locations of the file data are provided by pointers, which may further reference indirect blocks (e.g., L1 blocks, FIG. 2B) that, in turn, reference the data blocks (e.g., L0 blocks, FIG. 2B), depending upon the amount of data in the file.

Each storage operating system instance 36 may also include a protocol layer and an associated network access layer, to enable communication over a network with other systems. Protocol layer may implement one or more of various higher-level network protocols, such as NFS (Network File System) (44A-44N), CIFS (Common Internet File System) (46A-46N), S3 (48A-48N), Hypertext Transfer Protocol (HTTP), TCP/IP and others. The S3 protocol uses an HTTP REST (Representational State Transfer) API (Application Programming Interface) that utilizes HTTP requests e.g., "get", "put", "post," and "delete," requests for reading, storing and deleting data. The S3 48 interface is used to store and retrieve storage objects stored at cloud storage, as described below.

The network access layer may also include one or more drivers, which implement one or more lower-level protocols to communicate over the network, such as Ethernet.

Each operating system instance 36 may also include a storage access layer and an associated storage driver layer to communicate with the storage devices. The storage access layer may implement a higher-level disk storage protocol, such as a RAID layer, and a zone translation layer (ZTL), while the storage driver layer may implement a lower-level storage device access protocol, such as the NVMe protocol.

Each operating system instance 36 executes an exclusive interface (may also be referred to as exclusive RAID CNS) 38A-38N and a shared interface (may also be referred to as shared RAID ZNS) 40A-40N. The exclusive interface 38 provides access to exclusive private, HFE 27 for hot data and metadata using an exclusive namespace, while the shared interface 40 provides access to globally shared LFE 29 using a shared namespace. The globally shared LFE 29 may also be used to store hot read-only data 56 that is accessible to any of the storage operating system instances 36. This allows a system to promote read data that becomes hot but is still stored at a capacity tier (i.e., LFE 29). This configuration provides globally shared LFE 29 with "read anywhere" capability.

The FIG. 1D configuration enables data tiering along with dis-aggregated shared storage. Furthermore, this configuration resolves distributed RAID challenges because each storage device 14A-14N internally implements redundancy for each zone (see FIG. 1C) across failure domains, thus relieving the storage OS instances 36 to implement RAID across failure domains inside the PB SSD 14 (as would be the case if PB SSD was implemented as a collection of distinct SSDs visible to each storage OS instance). Furthermore, one of the storage operating system instances 36 can be responsible for responding to errors using both shared and exclusive storage.

The FIG. 1D configuration further alleviates the shared storage problem of conventional systems, according to one aspect of the present disclosure. The FIG. 1D configuration is used to divide storage space into exclusive and shared storage pools using NVMe namespaces. The metadata and mutating data are stored in HFE 27. Immutable data is efficiently stored by the storage operating instances 36 in shared LFE 29. Immutable data from the LFE can be accessed by multiple storage operating instances 36, without having to promote the cold data to hot data storage tiers. This improves processing read requests and reduces the overall cost of storing data since LFE are cheaper than HFE.

Figure 1E:
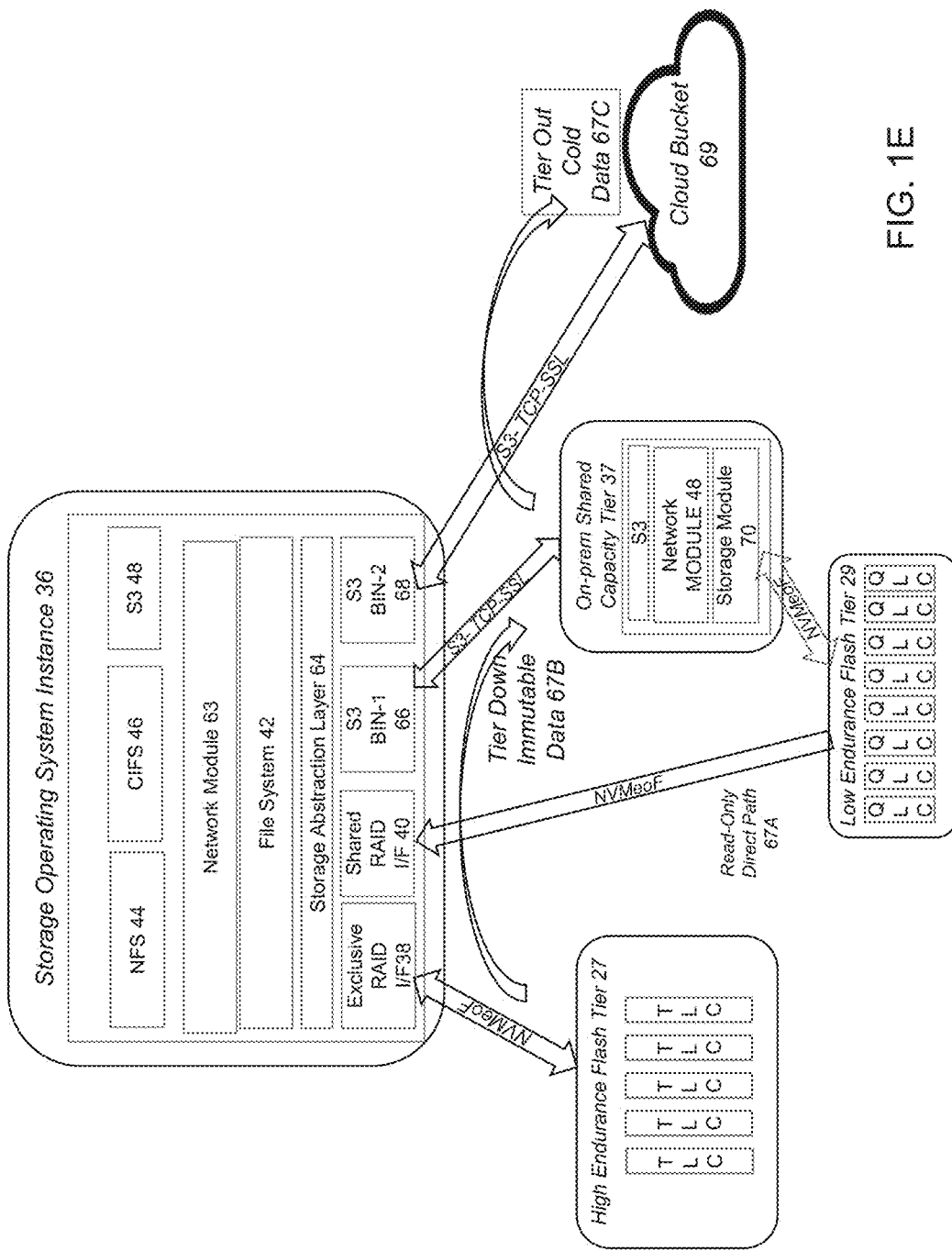
FIG. 1E shows an example of data tiering using shared namespace and exclusive namespace to access a plurality of ZNS SSDs, according to one aspect of the present disclosure.

FIG. 1E shows an example of using scalable flash tiering, according to one aspect of the present disclosure. In FIG. 1E the storage operating system instance 36 includes a network module 63 that executes the network protocol layers to interfaces with client systems. A storage abstraction layer ("SAL") 64 stores information regarding various storage resources used and available for different client systems. SAL 64 maintains a "storage footprint" or storage layout for different storage resources (for example, storage systems including storage devices). S3 BIN-1 66 and S3 BIN-2 68 are software layers that interface with a capacity tier storage operating system instance 37 or an object storage bucket 69 in the cloud.

The capacity tier storage (i.e., LFE 29) may be managed by the storage operating system instance 37 with a storage module 70 that interacts with the LFE capacity tier storage 29. Data at the capacity tier 29 is accessed directly through shared interface 40 via read path 67A, while exclusive interface 38 accesses data at HFE 27. When data at HFE 27 becomes immutable, it is tiered down as immutable data 67B to LFE 29. Cold data 67C can also be tiered out to cloud storage 69 via interface 68.

In one aspect, using a dedicated capacity storage operating system instance 37 to manage LFE 29 is advantageous because the objects written to LFE 29 can be efficiently checked for duplicate blocks by the storage operating system instance 37, thus providing global dedupe across multiple instance objects.

In one aspect, the various namespaces (e.g., NSD1-NSID 12, FIG. 1C) are enabled by a processor executable configuration process. The process is executed before the storage devices 14 are initialized. During configuration, the ZNS and CNS are first determined based on the number of storage operating system instances and a number of failure domains that are advertised by the storage devices 14. For example, if the number of failure domains are 4 (as shown in FIG. 1C) then the configuration process creates at least 1 CNS and 1 ZNS per failure domain. The total storage capacity and type of SSD (i.e., LFE or HFE) assigned to each namespace is based on the size determined by configuration process. In general, the ZNS (e.g., 19, FIG. 1B) is used for LFE 29 (e.g., QLC) and consumes the majority of the storage capacity of each domain. The CNS size (e.g., NVRAM 26 and HFE 27) is based on the amount of metadata and the expected amount of hot & mutable data. As an example, CNS can be in the range of 5%-10% of the size of the ZNS. It is noteworthy that although storage namespaces are shown as distinct namespaces, i.e., CNS and ZNS, the adaptive aspects of the present disclosure are not limited to different namespaces. CNS is simply shown to as a private namespace for HFE (e.g., TLC), while ZNS is shown as shared namespace for LFE (e.g., QLC).

The configuration process starts the storage operating system instances 36 to discover the various namespaces. Once the namespaces are visible to each storage operating system instance 36, the ownership of each namespace is assigned. The ownership information regarding each namespace is maintained as specific block offsets at a storage location. The configuration process next configures RAID or other redundancy schemes over the namespaces. The specific configuration of redundancy scheme depends on whether a single appliance with multiple storage devices is being configured or a collection of appliances are being used. An example configuration for a single appliance could be RAID1 across failure domains. After RAID or other redundancy schemes have been configured, the storage system instances 36 create aggregates and volumes on the namespaces owned by each. The ZNS may be assigned ownership i.e., full read/write access by special storage system instances 36 that serve as shared cold data repositories to the other storage system instances 36, but read-only access is granted to the ZNS from non-owner instances. Ownership and shared access may be asserted using NVMe protocol reservation on the namespaces during system operation.

Figure 2A:
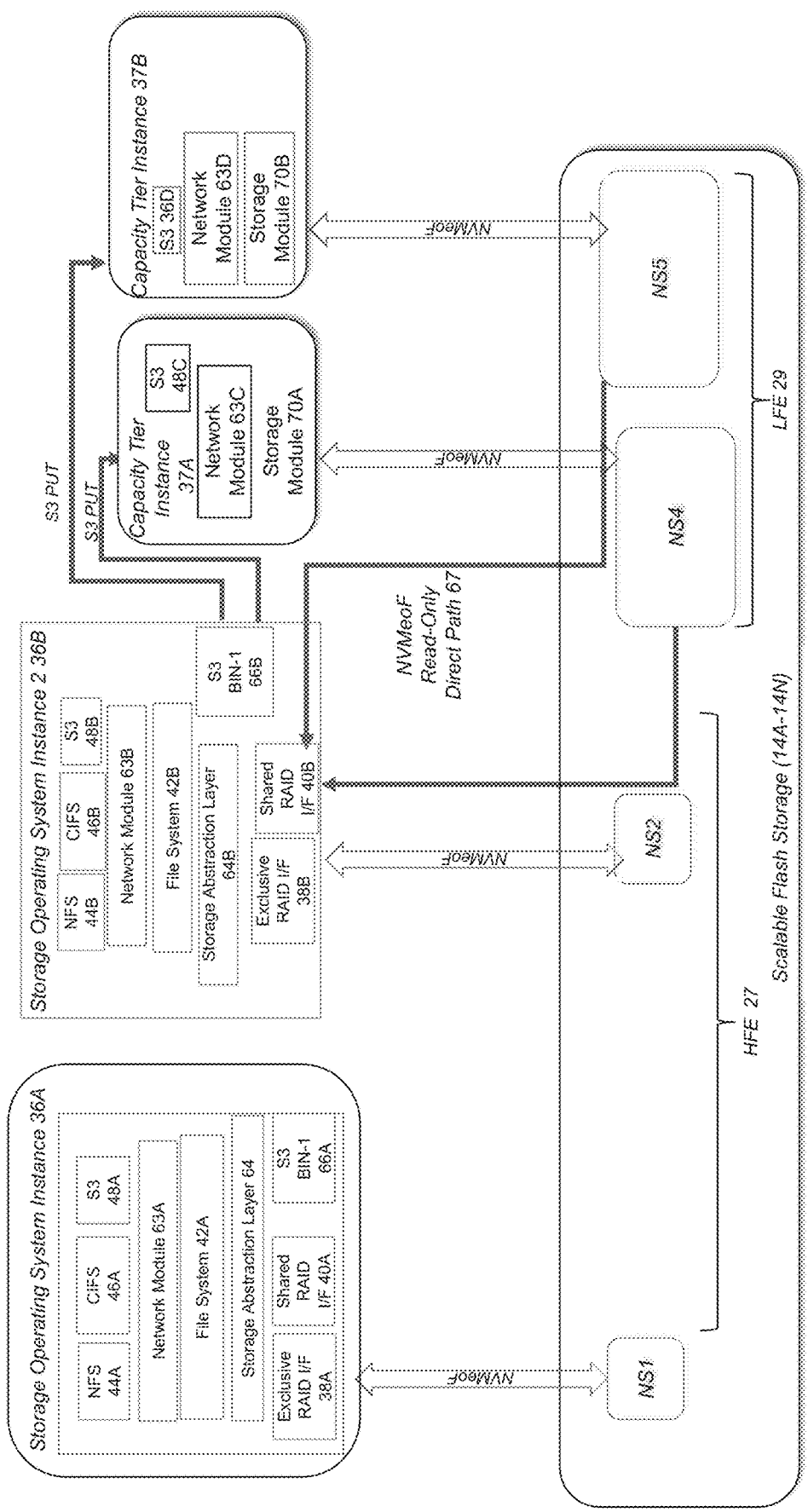
FIG. 2A shows an example of using shared namespace and exclusive namespace by multiple storage operating system instances, according to one aspect of the present disclosure.

FIG. 2A shows an example of implementing the different namespaces (e.g., as shown in FIG. 1E) in storage devices 14A-14N having HFE 27 and LFE 29, according to one aspect of the present disclosure. The storage operating system instance 36A executes an exclusive RAID interface 38A that owns/manages (or is assigned) a higher endurance namespace such as NS1 (Namespace 1) to access hot and mutable data stored in HFE 27. The storage operating system instance 36B executes an exclusive RAID interface 38B to access hot and mutable data stored in HFE 27 using NS2 (Namespace 2). LFE namespaces NS4 and NS5 are owned/managed (or assigned) by capacity tier instances 37A and 37B, respectively. The shared RAID interface 40B is used by the storage operating system instance 36B to access data from LFE 29 using the shared or ZNS namespace NS4 and NS5 (e.g., using the read only path 67). In this example, the storage operating system instance 36B can also write to the shared LFE 29. Data can be written via the S3 interface 66B and capacity tier instances 37A and/or 37B using the namespace NS4.

Figure 2B:
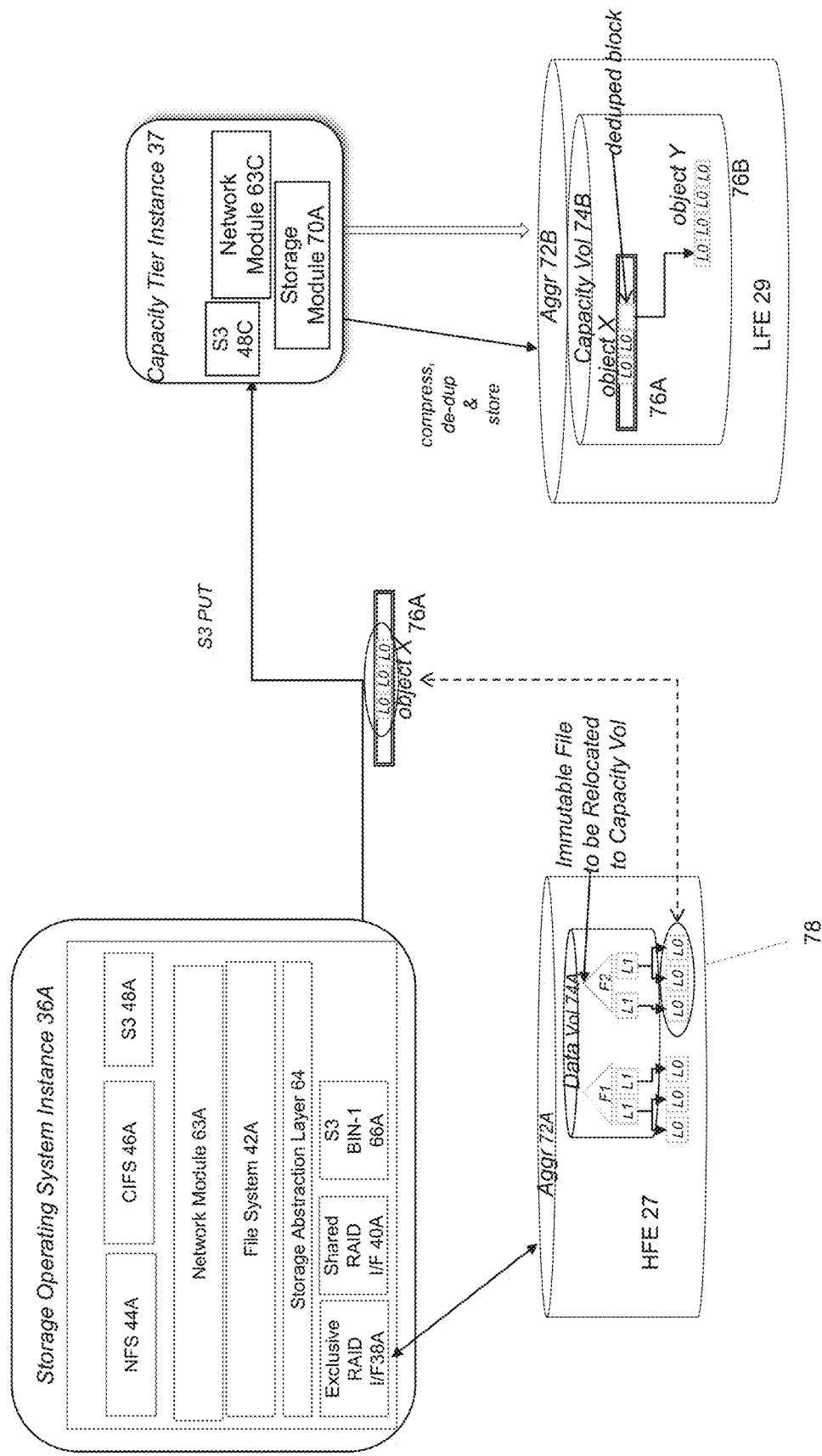
FIG. 2B shows an example of moving an immutable stored object to a capacity tier (i.e., low endurance flash storage) from high endurance flash storage, according to one aspect of the present disclosure.

FIG. 2B shows an example of tiering down data from HFE 27 to LFE 29. A data volume (or a logical unit (LUN)) 74A of an aggregate 72A is managed by the storage operating system instance 36A. The data volume 74A may be configured to store data files (or data containers or data objects), scripts, word processing documents, executable programs, and any other type of structured or unstructured data. From the perspective of a client system, each volume can appear to be a single storage drive. However, each volume can represent namespaces from one or more storage devices 14A-14N.

In capacity tier (e.g., LFE 29), aggregate 72B includes one or more capacity volumes 74B to store immutable data or readable hot data. The immutable data may be compressed and de-duplicated.

In the example of FIG. 2B, hot and mutable data are shown as files F1 and F2. Each file has indirect blocks L1 that store pointers to data blocks L0 (e.g., 78). When file F2 becomes immutable (or cold), then the S3 interface 66A uses a S3 put operation to place the file in capacity tier 29 as object X (76A). To improve storage efficiency, object X is compressed and de-duped, and stored as object Y (76B) by the capacity tier interface 37.

Figure 2C:
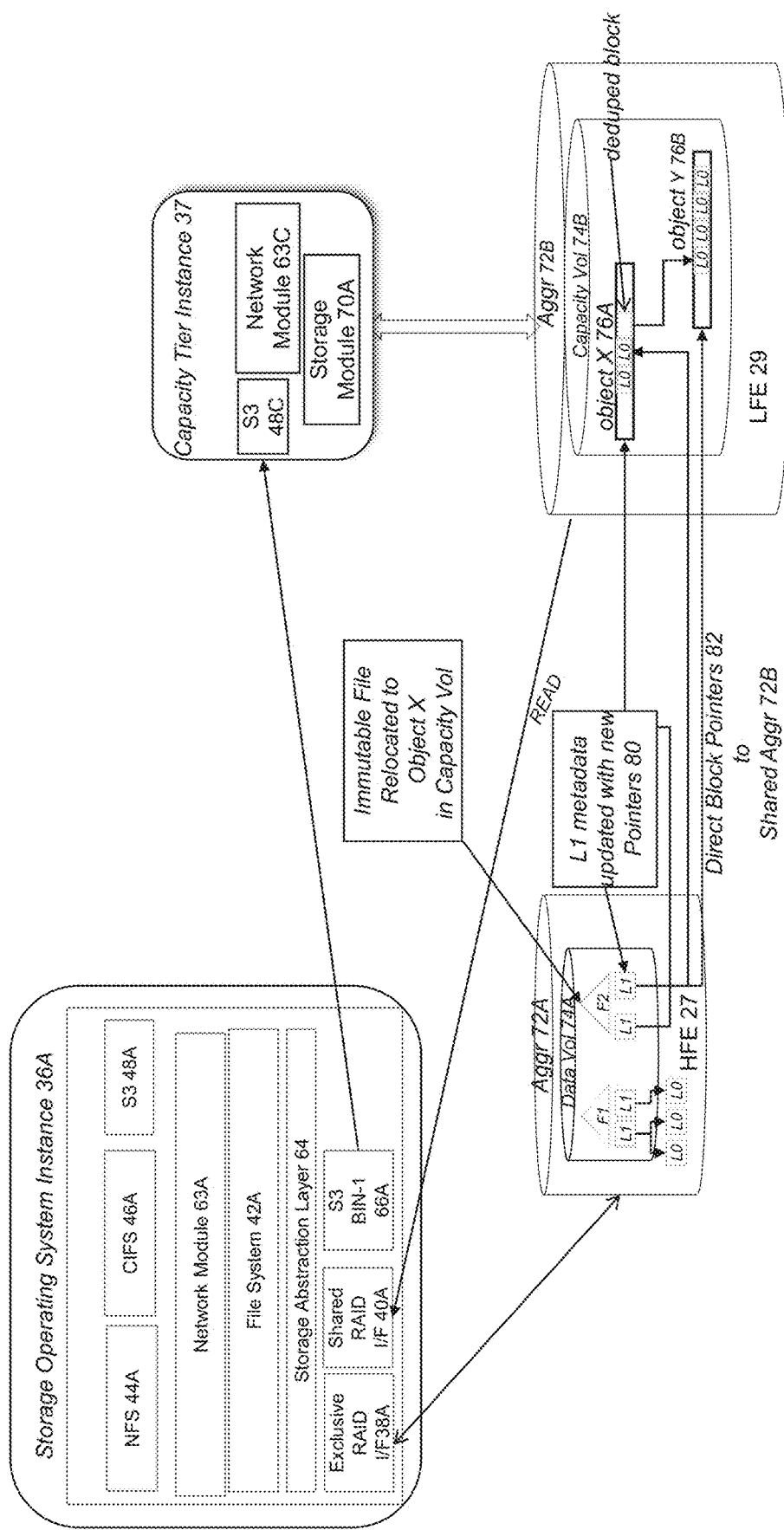
FIG. 2C shows an example of updating metadata when an immutable stored object is moved to a capacity tier from high endurance flash storage, according to one aspect of the present disclosure.

FIG. 2C shows metadata update after file F2 is moved to capacity tier, LFE 29 as object X, according to one aspect of the present disclosure. The metadata at TLC 27 is updated with new pointers 82 (shown in block 80) pointing to the capacity tier storage location of object X 76A/Y 76B. This enables the storage operating system instance 36A to access data directly from capacity volume 74B using the pointers 82.

FIG. 2D shows an example of multiple storage operating system instances 36A-36C sharing LFE 29 of storage devices 14A-14N for storing immutable data 54 and storing metadata and buffered data 52A-52C at HFE 27A-27C/NVRAM 26A-26C of storage devices 14A-14N. As an example, the storage operating system instance 36A uses an exclusive namespace NS1 to access HFE 27A/NVRAM 26A, the storage operating system instance 36B uses an exclusive namespace NS2 to access HFE 27B/NVRAM 26B, and the storage operating system instance 36C uses an exclusive namespace NS3 to access HFE 27A/NVRAM 26A. Immutable data can be read by any storage operating system instance 36A-36C using the shared namespace NS4.

Figure 2E:
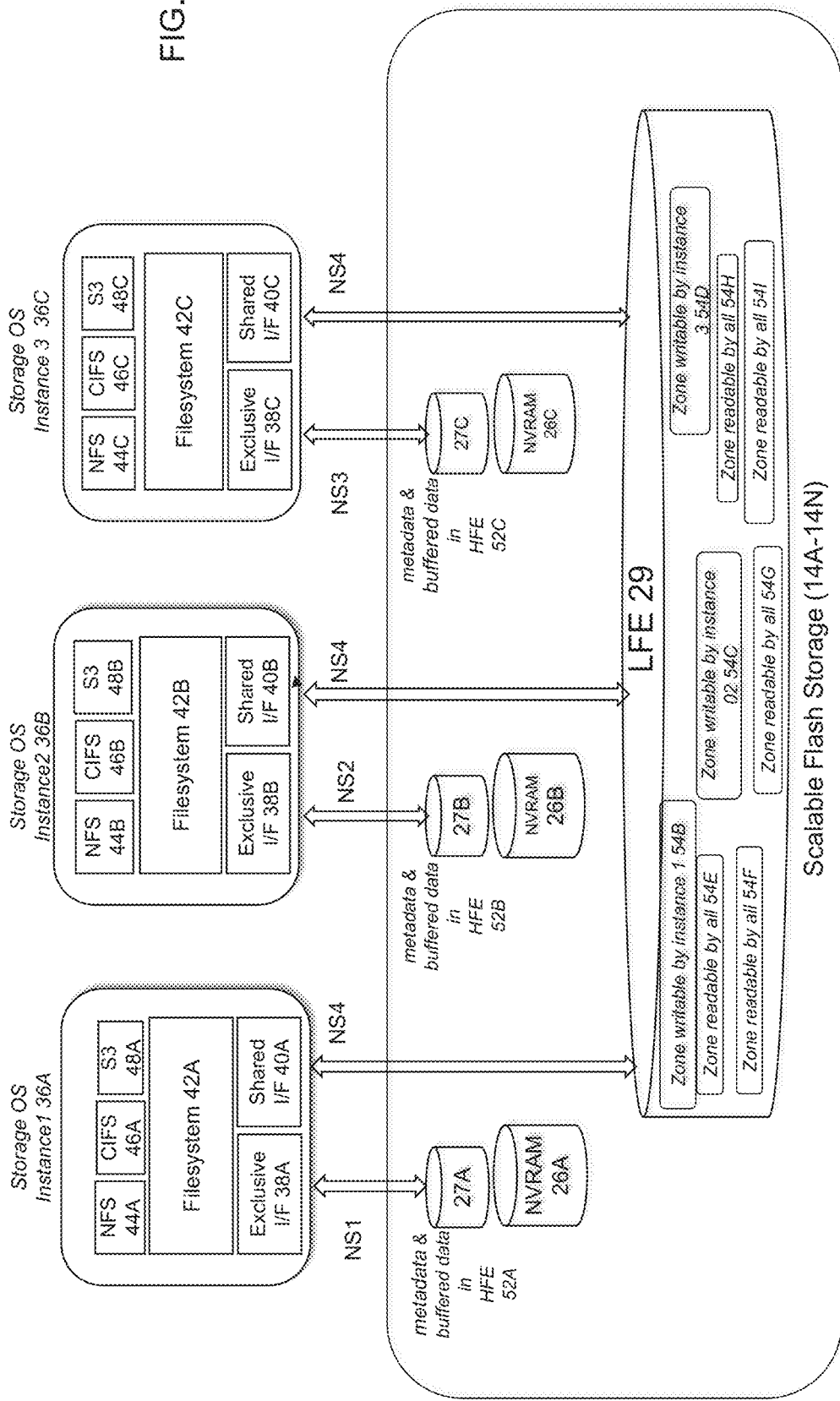
FIG. 2E shows another example of a scalable ZNS SSD architecture, according to one aspect of the present disclosure.

FIG. 2E shows another aspect of the present disclosure without a dedicated capacity tier storage operating system instance, and instead using storage operating system instances 36A-36C. In the configuration of FIG. 2E, different zones 54B-54I at LFE 29 have different permissions. For example, zone 54B is writable by storage operating system instance 37A using namespace NS1, zone 54C is writable by storage operating system instance 37B using namespace NS2, zone 54D is writable by storage operating system instance 37C using namespace NS3, and zones 54E-54I are readable for all storage operating system instances via shared namespace NS4. It is noteworthy that each storage operating system instance 36A-36C can access the read-only zones using metadata stored at HFE 27A-27C and NVRAM 26A-26C.

In one aspect, to implement the configuration of FIG. 2E, a shared data structure (not shown) stores information regarding each zone in LFE 29. This data structure can be replicated via multiple CNS, namely, NS1 for the storage operating system instance 36A, NS2 namely NS2 for the storage operating system instance 36B and NS3, for the storage operating system instance 36C. Each zone may have the following states: "Free," "Full", "Readable by any", or "Writable-by-owner". Whenever a storage operating system instance wants to modify the shared data structure to change the state of any zone it atomically obtains a lock on a page storing the zone state. After obtaining the lock, the update to the state change is written to all replicas. The update is successful if a write quorum number of replicas were successfully updated, if not, the update is rolled back, and the lock is released. Other data structures for tracking shared zone information, for example, reference counts on data blocks in zones can be managed in a similar way. The reference counts are updated whenever a file is deleted or overwritten that release blocks within a zone.

Process Flows: FIGS. 2F-2J show various process flows for using the innovative architecture described above. In one aspect, the various namespaces (e.g., NSD1-NSID 12, FIG. 1C) are enabled by a processor executable configuration process. The process is executed before the storage devices 14 are initialized. During configuration, several ZNS and CNS are first determined based on the number of storage operating system instances and a number of failure domains that are advertised by the storage devices 14. For example, if the number of failure domains are 4 (as shown in FIG. 1C) then the configuration process creates at least 1 CNS and 1 ZNS per failure domain. The total storage capacity and type of SSD assigned to each namespace is based on the size determined by configuration process. In general, the ZNS is used for LFE 29 (e.g., QLC) and consumes majority of the storage capacity of each domain. The CNS size (e.g., 26 and HFE 27) is based on the amount of metadata and the expected amount of hot & mutable data. As an example, CNS can be in the range of 5%-10% of the size of the ZNS. It is noteworthy that although storage namespaces are shown as distinct namespaces, i.e., CNS and ZNS, the adaptive aspects of the present disclosure are not limited to different namespaces. CNS is simply shown as a private namespace for HFE (e.g., TLC), while ZNS is shown as shared namespace for LFE (e.g., QLC).

The configuration process then starts the storage operating system instances to discover the various namespaces. Once the namespaces are visible to each instance, the ownership of each namespace is assigned. The ownership information regarding each namespace is maintained as specific block offsets. The configuration process next configures RAID or other redundancy schemes over the namespaces. The specific configuration of redundancy scheme depends on whether a single appliance is being configured or a collection of appliances are being used. An example configuration for a single appliance could be RAID1 across failure domains. After RAID or other redundancy schemes have been configured, the storage system instances 36 create aggregates and volumes on the namespaces owned by each. The ZNS 19 may be assigned ownership i.e., full read/write access by special storage system instances that serve as shared cold data repositories to the other storage system instances, but read-only access is granted to the ZNS from non-owner instances. Ownership and shared access may be asserted using NVMe protocol reservation on the namespaces during system operation.

Figure 2F:
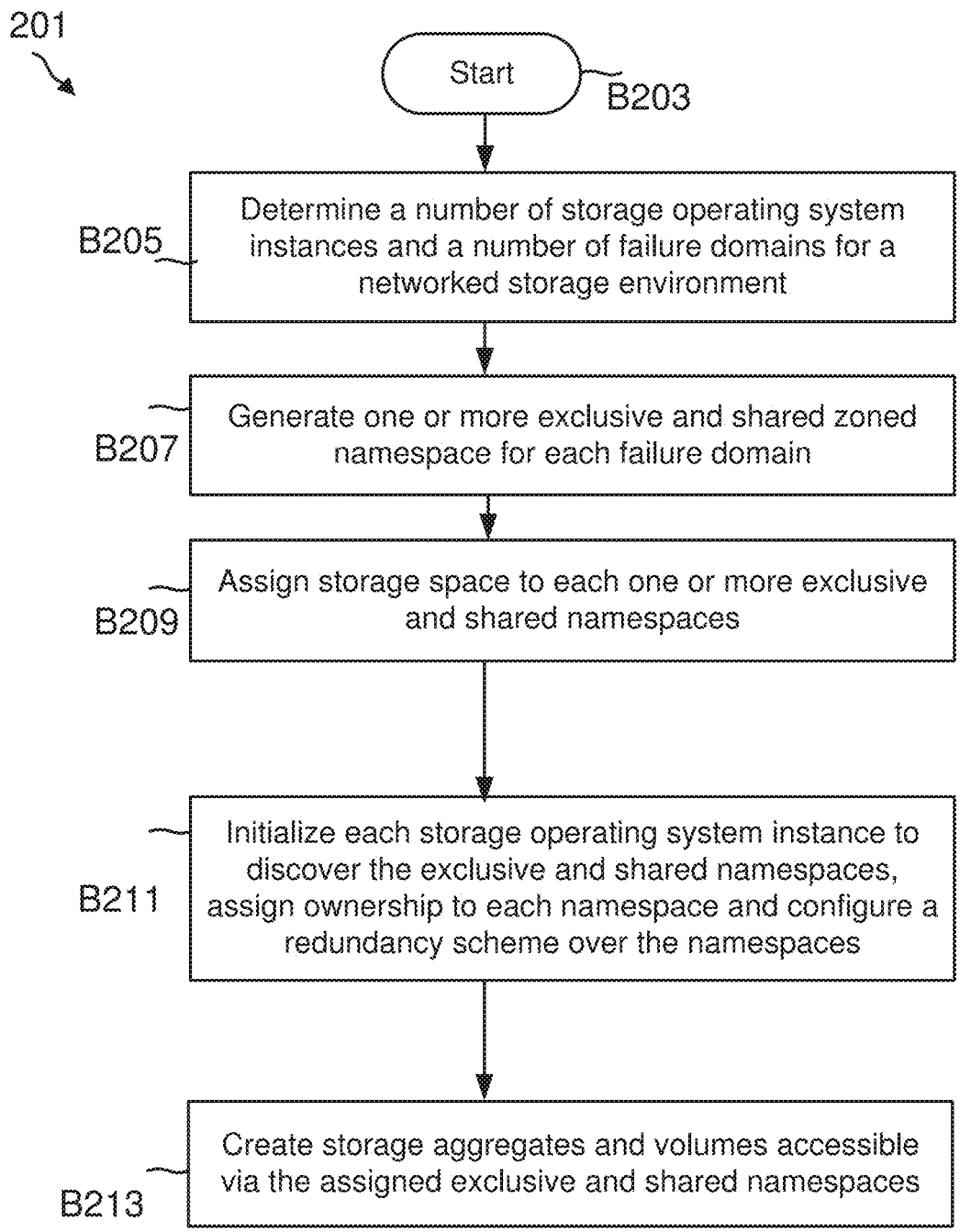
FIG. 2F shows a process flow for configuring a scalable ZNS SSD architecture, according to one aspect of the present disclosure.

FIG. 2F shows a configuration process 201, according to one aspect of the present disclosure. Process 201 begins in block B203, before the storage devices 14 are deployed. In block B205, the process determines the number of storage operating system instances (36A-36N) and the number of failure domains for the storage devices 14. Based on that, in block B207, exclusive namespace (e.g., NS1 and NS2, FIG. 2A) and shared ZNS (e.g., NS4 and NS5, FIG. 2A) are assigned to each failure domain. For example, if the there are 4 failure domains, then the process creates at least one exclusive and 1 shared namespace. Thereafter, in block B209, storage space at HFE 27 and LFE 29 is assigned to the exclusive and shared namespaces.

In block B211, each storage operating system instance 36A-36N is initialized and discover the assigned exclusive namespace (e.g., NS1 and NS2, FIG. 2A and shared namespaces (e.g., NS4 and NS5, FIG. 2A). Ownership is assigned to each storage operating system instance 36 and a RAID redundancy scheme is configured. Thereafter, in block B213, aggregates and volumes are created that can be accessed via the exclusive (e.g., NS1 and NS2, FIG. 2A) and shared namespaces (e.g., NS4 and NS5, FIG. 2A), as described above in detail.

Figure 2G:
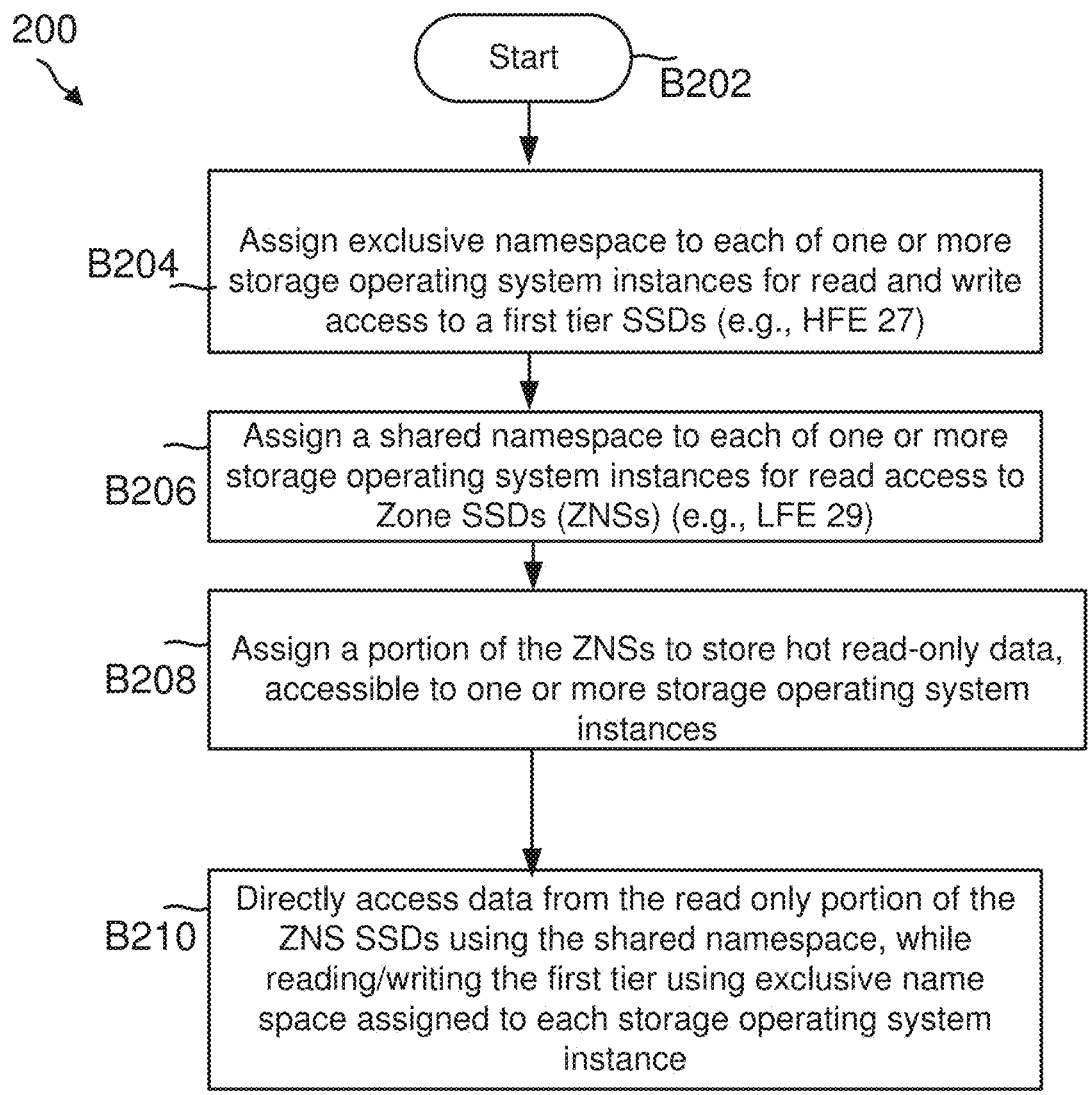
FIG. 2G shows another process flow for configuring a scalable ZNS SSD architecture, according to one aspect of the present disclosure.

In one aspect, FIG. 2G shows another process 200 that enables multiple storage operating system instances 36A-36N to access read only data from shared LFE 29, while using HFE 27 for reading, writing and storing metadata (see FIG. 1D). Process 200 begins in block B202, when storage devices 14 are configured with HFE 27, LFE 29 and NVRAM 26 (see FIG. 1B).

In block B204, exclusive namespace (e.g., NS1 and NS2, FIG. 2A) is assigned to each storage operating system instance 36A-36N, as described above with respect to FIG. 2F. The exclusive namespace (e.g., NS1 and NS2, FIG. 2A) is used by each storage operating system instance 36 to read and write information at HFE 27, including metadata associated with the stored data.

In block B206, a shared namespace (e.g., NS4 and NS25, FIG. 2A) is assigned to each storage operating system instance 36A-36N, as described above with respect to FIG. 2F. This enables read access to data stored in LFE 29. In one aspect, in block B208, a portion of the LFE 29 (e.g., shown as 56 in FIG. 1D) is configured to store hot read only data, without having to promote the hot read only data to HFE 27. The hot data in this context means data is being read frequently by the storage operating system instances 36 using the shared namespace.

In block B210, the storage operating system instances 36A-36N directly access data from portion 56 using the shared namespace, while continuing to use HFE 27 for read and write access.

Figure 2H:
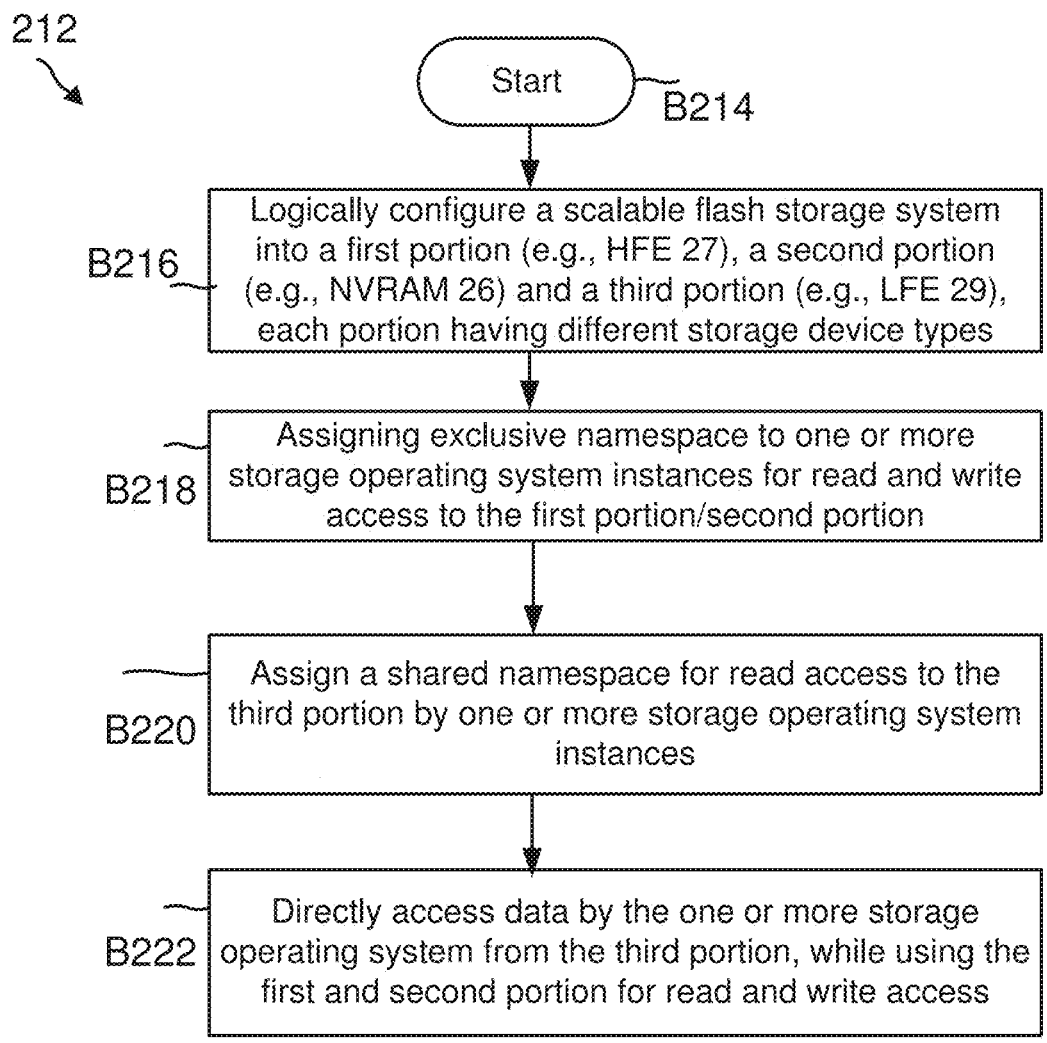
FIG. 2H shows yet another process flow for configuring a scalable ZNS SSD architecture, according to one aspect of the present disclosure.
Figure 21:
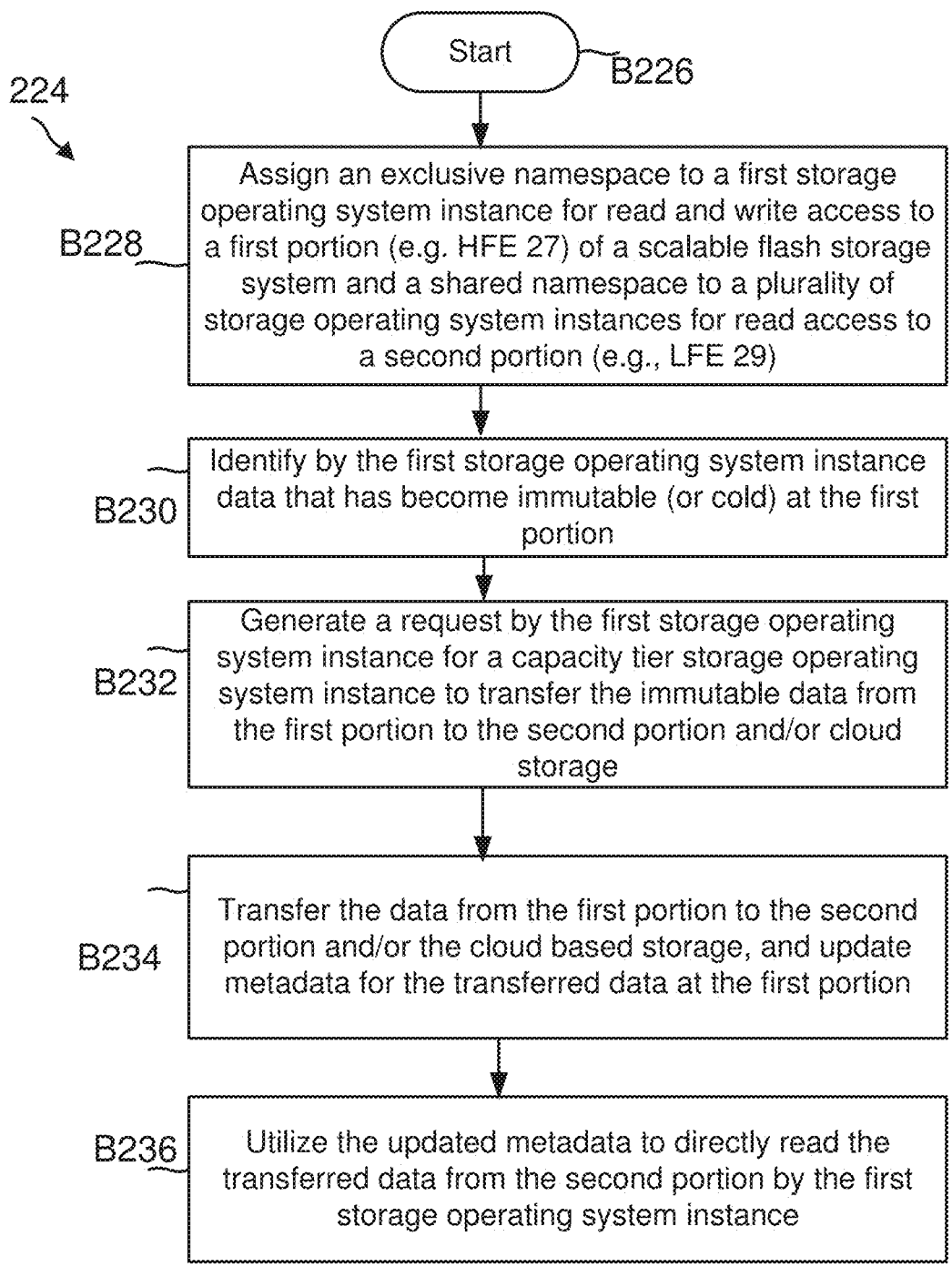

FIG. 2H shows another process 212 to configure storage devices 14, according to one aspect of the present disclosure. Process 212 begins in block B214 when one or more storage devices 14 are configured with a first portion, e.g., HFE 27, a second portion, NVRAM 26 (see FIG. 1B) and a third portion, LFE 29 for use by one or more storage operating system instances 36A-36N. In block B216, one or more storage devices 14 are logically separated into the three portions, to use the storage space at HFE 27, LFE 29 and NVRAM 26. In block B218, an exclusive namespace (e.g., NS1 and NS2, FIG. 2A) is assigned to each storage system instance 36A-36N, as described above with respect to FIGS. 2A and 2F. This enables read and write access for each storage system instance 36A-36N to HFE 27. As an example, HFE 27 is configured to store metadata and hot data.

In block B220, a shared namespace (e.g., NS4 and NS5, FIG. 2A) is assigned to the storage operating system instances 36A-36N for read access to LFE 29 as described above with respect to FIGS. 2A and 2F. In block B222, the storage operating system instances 36 read data from LFE 29 using the shared namespace. To read and write data from HFE 27, the exclusive namespace of each storage operating system instances 36 is used.

FIG. 2I shows a process 224 that enables a storage operating system instance 36 to transfer data from HFE 27 to the shared LFE 29 (see FIGS. 2C/2D), according to one aspect of the present disclosure. Process 224 begins in block B226, when storage devices 14 are configured with HFE 27, LFE 29 and NVRAM 26.

In block B228, an exclusive namespace (e.g., NS1 and NS2, FIG. 2A) is assigned (as described above with respect to FIGS. 2A and 2F) to at least one of the storage operating system instances 36A-36N, may also be referred to as a first storage operating system instance (e.g., 36A, FIG. 2C). The exclusive namespace is used by the first storage operating system instance 36A to read from and write information to HFE 27, including metadata associated with the data stored at LFE 29. Furthermore, a shared namespace (e.g., NS4 and NS5, FIG. 2A) is assigned as described above with respect to FIGS. 2A and 2F) to multiple storage operating system instances 36 to enable shared read access at LFE 29.

In one aspect, in block B230, the first storage system instance 36A identifies data that may have become cold or immutable (e.g., file F2, FIG. 2B). The first storage operating system instance 36A tracks when data is stored, modified and accessed. Based on that the first storage operating system instance 36A determines when data becomes cold data or immutable data.

In block B232, the S3 BIN interface 66A of the first storage operating system instance 36A requests (e.g., S3 PUT, FIG. 2B) the capacity tier instance 37 to transfer the file F2 from HFE 27 to LFE 29.

In block B234, the capacity tier instance 37 transfers the file F2 as object X 76A and stores the object X 76A at the LFE 29. It is noteworthy that the object X 76A may also be stored at a cloud-based storage 69, as shown in FIG. 1E. In another aspect, the cold data is only transferred to the cloud-based storage 69. The metadata for the file F2 is updated with new pointers (e.g., 82, FIG. 2C) that points to the storage location where object X 76A (or Object Y 76B) is stored at LFE 29. When the storage operating system instance 36A receives a read request to read file F2, in block B236, the updated metadata, i.e., the direct block pointers 82 (FIG. 2C) are used to access the data stored at LFE 29 for the file F2.

In one aspect, a method for using the HFE 27 and LFE 29 is provided. The method includes assigning (e.g., B228, FIG. 2I) a first namespace (e.g., NS4, FIG. 2A) to a first instance (e.g., 36B, FIG. 2A) of a storage operating system and a second instance (e.g., 37A, FIG. 2A) of the storage operating system for enabling read access to a first portion (e.g., LFE 29) of a flash storage system by the first instance, and read and write access to the second instance; allocating (e.g., B228, FIG. 2I) a second namespace (e.g., NS2, FIG. 2A) to the first instance for exclusive read and write access within a second portion (e.g., HFE 27, FIG. 2A) of the flash storage system; generating (e.g., B232, FIG. 2I), by the first instance, a request for the second instance to transfer a data object (e.g., 76A, FIG. 2B) from the second portion owned by the first instance to the first portion; storing (e.g., B234, FIG. 2I), by the second instance, the data object at the first portion; and updating (e.g., B234, FIG. 2I) metadata of the data object at the second portion, the metadata (e.g., 80, FIG. 2C) indicating a storage location (e.g., 82, FIG. 2C) at the second portion where the data object is stored.

The method further includes utilizing (e.g., B236, FIG. 2I), by the first instance, metadata at the second portion to retrieve the data object from the first portion, in response to a read request for the data object received by the first instance. The method also includes identifying (e.g., B230, FIG. 2I), by the first instance, that the data object has become cold and in response, transmitting the request to the second instance.

In one aspect, updating the metadata of the data object at the second portion includes storing a pointer (e.g., 82, FIG. 2C) at the second portion owned by the first instance, the pointer pointing to the storage location of the data object at the first portion.

In one aspect, the first portion includes a first type of solid-state drive (e.g., QLC) and the second portion includes a second type (e.g., TLC) of solid-state drive, where the first type is a capacity tier with storage performance lower than the second type. Furthermore, the first namespace is a zoned namespace (e.g., ZNS 19) for providing shared read access to the first and second instance and write access to the second instance.

Figure 2J:
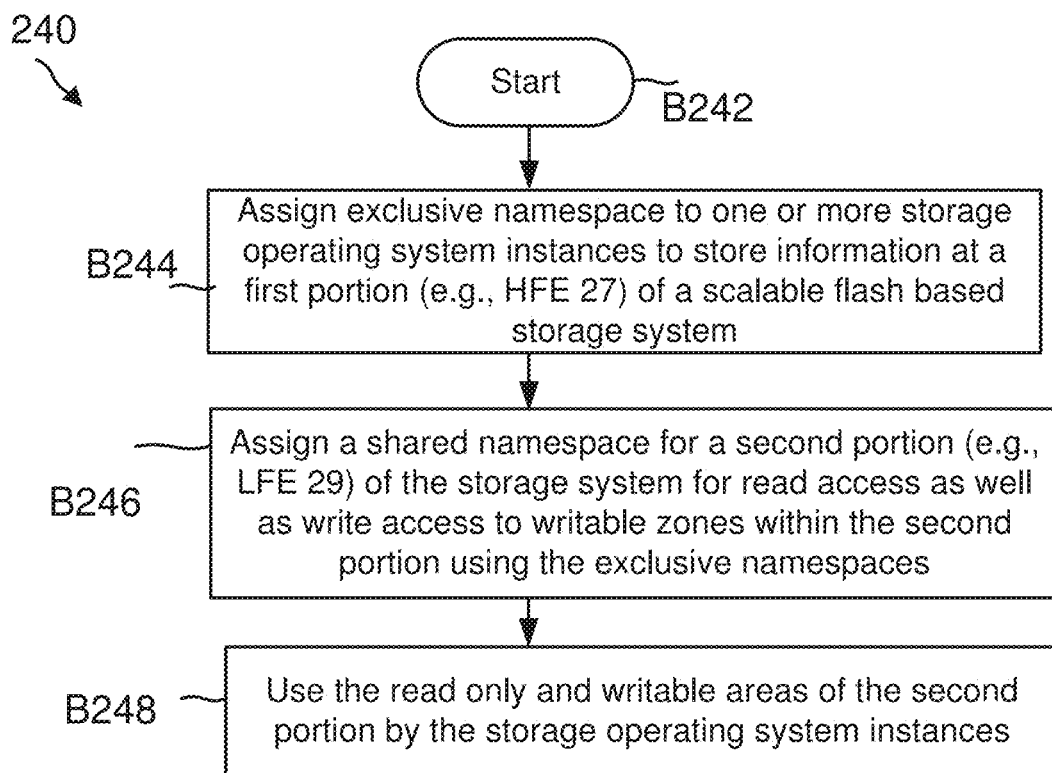
FIG. 2J shows another process flow for configuring a scalable ZNS SSD architecture, according to one aspect of the present disclosure.

FIG. 2J shows a process 240 using the architecture of FIG. 2E, described above in detail, according to one aspect of the present disclosure. Process 240 begins in block B242, when storage devices 14 are configured with HFE 27A-27C, LFE 29 and NVRAM 26A-26C (see FIG. 2E), where the HFE 27A-27C is referred to as a first portion, NVRAM 26A-26C is referred to as the second portion and LFE 29 is referred to as a third portion.

In block B244, an exclusive namespace (e.g., NS1, NS2 and NS 3, FIG. 2E) is assigned to each storage operating system instance 36A-36C to enable access to HFE 27A-27C. Each exclusive namespace is used by a corresponding storage operating system instance 36A-36C to read and write information at HFE 27, including metadata associated with the stored data.

In block B246, a shared namespace (e.g., NS4) is assigned to the multiple storage operating system instances 36A-36C to enable read access at LFE 29. The various zones in LFE 29 are configured such that some portions are writable by the storage operating system instances 36A-36C. For example, zone 54B is writable by the storage operating system instance 36A using namespace NS1, zone 54C is writable by the storage operating system instance 36B using namespace NS2 and zone 54D is writable by the storage operating system instance 36C using namespace NS3. Zones 54E, 54F, 54G, 54H and 54I are readable by any storage operating system instance 36A-36C using the shared namespace, NS4. HFE 27A-27C and NVRAM 26A-26C are used for storing metadata and buffered data.

In block B248, the read only and writable zones of LFE 29 are used by the storage operating system instances 36A-36C. The metadata can be used by each storage operating system instances 36A-36C to access data from the shared zones of LFE 29 using the shared namespace NS4. The metadata at HFE 27 is maintained using the exclusive namespace NS1-NS3 by the storage operating system instances 36A-36C, respectively.

In one aspect, process 240 can be implemented by a shared data structure (not shown) that stores zone information in LFE 29. This data structure can be replicated via multiple CNS to HFE 27 (and or NVRAM 26). Each zone may have the following states: "Free," "Full", "Readable by any", or "Writable-by-owner". Whenever a storage operating system instance 36 wants to modify the shared data structure to change the state of any zone it atomically obtains a lock on a page storing the zone state. After obtaining the lock the update to the state change is written to all replicas. The update is successful if a write quorum number of replicas were successfully updated, if not, the update is rolled back, and the lock is released. Other data structures for tracking shared zone information, for example, reference counts on data blocks in zones can be managed in a similar way. The reference counts are updated whenever a file is deleted or overwritten that release blocks within a zone.

In one aspect, methods and systems for are provided for using the configuration of FIG. 2E and the process of FIG. 2J. One method includes assigning (e.g., B246, FIG. 2J) a first shared namespace (e.g., NS4, FIG. 2E) to a first instance (e.g., 36A, FIG. 2E)) and a second instance (e.g., 36B, FIG. 2B) of a storage operating system for enabling write access to the first instance to a first zone (e.g., 54B, FIG. 2E) of a first portion (e.g., LFE 29) of a flash storage system (e.g., 14A-14N), and write access to the second instance to a second zone (e.g., 54C, FIG. 2E) of the first portion; using (B248, FIG. 2J) a first exclusive namespace (e.g., NS1, FIG. 2E) by the first instance to store metadata at a first segment (e.g., 27A, FIG. 2B) of a second portion (e.g., 27A-27C, FIG. 2E) of the flash storage system; using (e.g., B248, FIG. 2J) a second exclusive namespace (e.g., NS2, FIG. 2E) by the second instance to store metadata at a second segment (e.g., 27B, FIG. 2E) of the second portion of the flash storage system; and providing (e.g., B248, FIG. 2J) read only access to the first instance and the second instance to a second zone of the first portion using the first namespace.

The method further includes utilizing (e.g., B248, FIG. 2J), by the first instance, metadata at the first segment of the second portion to retrieve a data object from the second zone of the first portion, in response to a read request for the data object received by the first instance; and utilizing (e.g., B248, FIG. 2J), by the second instance, metadata at the second segment of the second portion to retrieve the data object from the second zone of the first portion, in response to a read request for the data object received by the second instance.

Figure 2K:
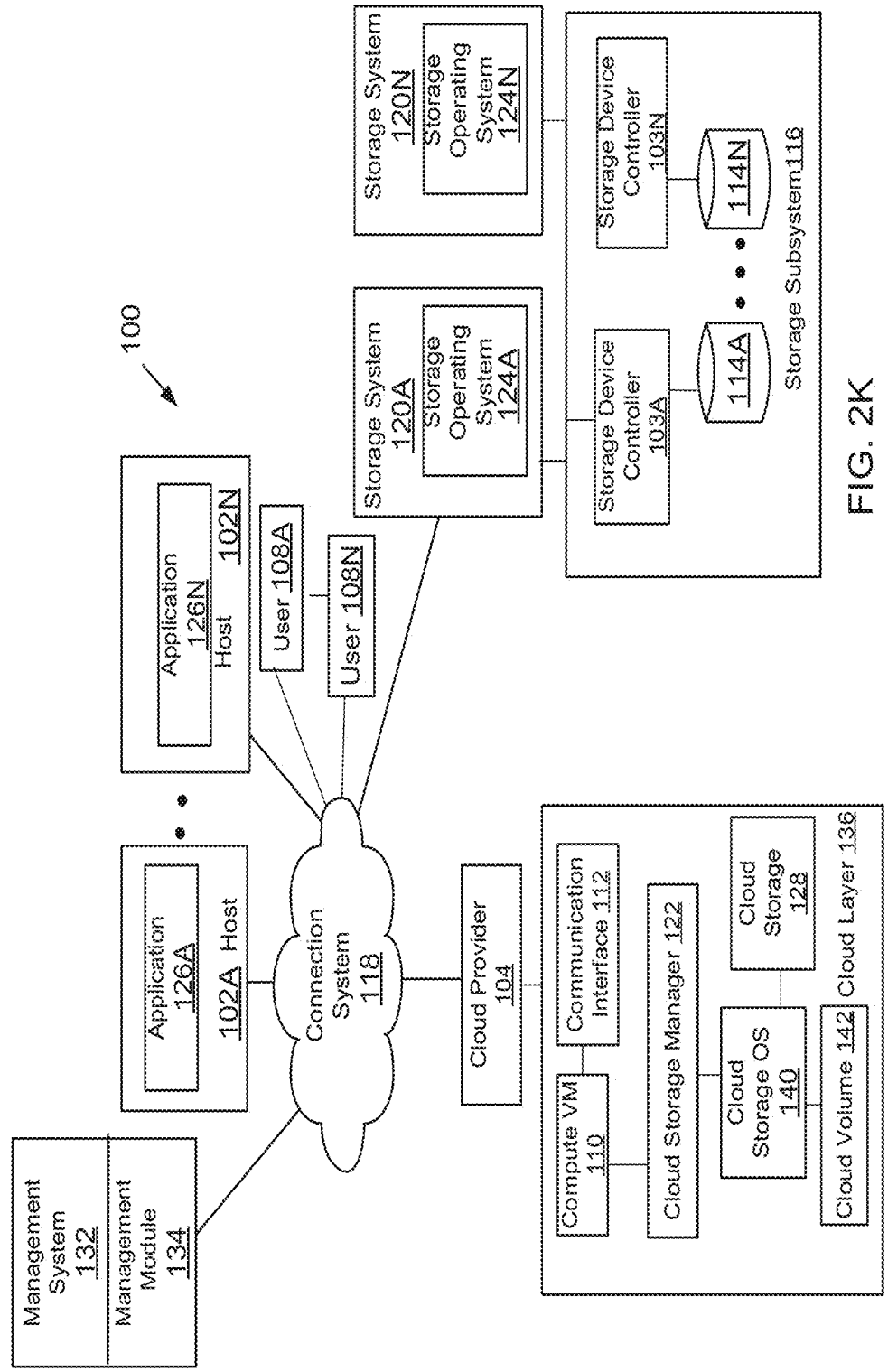
FIG. 2K shows a block diagram of an operating environment using a scalable ZNS architecture, according to one aspect of the present disclosure.

System 100: FIG. 2K shows an example of a networked operating environment 100 (also referred to as system 100) used according to one aspect of the present disclosure. As an example, system 100 may include a plurality of storage systems 120A-120N (may also be referred to as storage server/storage servers/storage controller/storage controllers 120, and also referred to as an "on-premises" storage system 120) executing a storage operating system 124A-124N (may also be referred to as storage operating system 124 or storage operating systems 124, similar to the storage operating system instances 36A-36C described above), a plurality of computing systems 102A-102N (shown as host 102, 102A-102N and may also be referred to as a "host system 102", "host systems 102", "server 102" or "servers 102") and user systems 108A-108N (may also be referred to as "user system 108," "user systems 108," "client system 108" or "client systems 108") that may access storage space provided by a storage-subsystem 116 managed by the storage systems 120 via a connection system 118 such as a local area network (LAN), wide area network (WAN), the Internet and others. The storage-subsystem 116 includes a plurality of storage devices 114A-114N (may also be referred to as storage device/storage devices/disk/disks 114). In one aspect, storage devices 114 are similar to storage devices 14A-14N with LFE 29 and HFE 27, described above in detail. It is noteworthy that the term "disk" as used herein is intended to mean any storage device/space and not to limit the adaptive aspects to any particular type of storage device, for example, hard disks.

In one aspect, the storage system 120 uses the storage operating system 124 to store and retrieve data from the storage sub-system 116 by accessing the storage devices 114 via a storage device controllers 103A-103N (similar to the NVMeoF controller 116 (FIG. 1B) described above) (may also be referred to as disk controller/disk controllers 103). Data is stored and accessed using read and write requests that are also referred to as input/output (I/O) requests. The storage devices 114 may be organized as one or more RAID groups. The various aspects disclosed herein are not limited to any storage device type or storage device configuration.

In one aspect, system 100 also includes a cloud layer 136 having a cloud storage manager (may also be referred to as "cloud manager") 122, and a cloud storage operating system (may also be referred to as "Cloud Storage OS") 140 (similar to storage operating system instances 36, FIG. 1E) having access to cloud storage 128 (similar to 69, FIG. 1E). The cloud storage manager 122 enables configuration and management of storage resources.

As an example, a cloud provider 104, provides access to the cloud layer 136 and its components via a communication interface 112. A non-limiting example of the cloud layer 136 is a cloud platform, e.g., Amazon Web Services ("AWS") provided by Amazon Inc., Azure provided by Microsoft Corporation, Google Cloud Platform provided by Alphabet Inc. (without derogation of any trademark rights of Amazon Inc., Microsoft Corporation or Alphabet Inc.), or any other cloud platform. In one aspect, communication interface 112 includes hardware, circuitry, logic and firmware to receive and transmit information using one or more protocols. As an example, the cloud layer 136 can be configured as a virtual private cloud (VPC), a logically isolated section of a cloud infrastructure that simulates an on-premises data center with the on-premise, storage system 120.

In one aspect, the cloud manager 122 is provided as a software application running on a computing device or within a VM for configuring, protecting and managing storage objects. In one aspect, the cloud manager 122 enables access to a storage service (e.g., backup, restore, cloning or any other storage related service) from a "microservice" made available from the cloud layer 136. In one aspect, the cloud manager 122 stores user information including a user identifier, a network domain for a user device, a user account identifier, or any other information to enable access to storage from the cloud layer 136.

Software applications for cloud-based systems are typically built using "containers," which may also be referred to as micro-services. Kubernetes is an open-source software platform for deploying, managing and scaling containers including the cloud storage OS 140, and the cloud manager 122. Azure is a cloud computing platform provided by Microsoft Corporation (without derogation of any third-party trademark rights) for building, testing, deploying, and managing applications and services including the cloud storage OS 140, the and cloud manager 122. Azure Kubernetes Service enables deployment of a production ready Kubernetes cluster in the Azure cloud for executing the cloud storage OS 140, and the cloud manager 122. It is noteworthy that the adaptive aspects of the present disclosure are not limited to any specific cloud platform.

The term micro-service as used herein denotes computing technology for providing a specific functionality in system 100 via the cloud layer 136. As an example, the cloud storage OS 140, and the cloud manager 122 are microservices, deployed as containers (e.g., "Docker" containers), stateless in nature, may be exposed as a REST (representational state transfer) application programming interface (API) and are discoverable by other services. Docker is a software framework for building and running micro-services using the Linux operating system kernel (without derogation of any third-party trademark rights). As an example, when implemented as docker containers, docker micro-service code for the cloud storage OS 140, and the cloud manager 122 is packaged as a "Docker image file". A Docker container for the cloud storage OS 140, and the cloud manager 122 is initialized using an associated image file. A Docker container is an active or running instantiation of a Docker image. Each Docker container provides isolation and resembles a lightweight virtual machine. It is noteworthy that many Docker containers can run simultaneously in a same Linux based computing system. It is noteworthy that although a single block is shown for the cloud manager 122 and the cloud storage OS 140, multiple instances of each micro-service (i.e., the cloud manager 122 and the cloud storage OS 140) can be executed at any given time to accommodate multiple user systems 108.

In one aspect, the cloud manager 122 and the cloud storage OS 140 can be deployed from an elastic container registry (ECR). As an example, ECR is provided by AWS (without derogation of any third-party trademark rights) and is a managed container registry that stores, manages, and deploys container images. The various aspects described herein are not limited to the Linux kernel or using the Docker container framework.

An example of the cloud storage OS 140 includes the "CLOUD VOLUMES ONTAP" provided by NetApp Inc., the assignee of this application. (without derogation of any trademark rights) The cloud storage OS 140 is a software defined version of a storage operating system 124 executed within the cloud layer 136 or accessible to the cloud layer 136 to provide storage and storage management options that are available via the storage system 120. The cloud storage OS 140 has access to cloud storage 128, which may include block-based, persistent storage that is local to the cloud storage OS 140 and object-based storage that may be remote to the cloud storage OS 140.

In another aspect, in addition to cloud storage OS 140, a cloud-based storage service is made available from the cloud layer 136 to present storage volumes (shown as cloud volume 142). An example of the cloud-based storage service is the "Cloud Volume Service," provided by NetApp Inc. (without derogation of any trademark rights). The term volume or cloud volume (used interchangeably throughout this specification) means a logical object, also referred to as a storage object, configured to store data files (or data containers or data objects), scripts, word processing documents, executable programs, and any other type of structured or unstructured data. From the perspective of a user system 108, each cloud volume can appear to be a single storage drive. However, each cloud volume can represent the storage space in one storage device, an aggregate of some or all the storage space in multiple storage devices, a RAID group, or any other suitable set of storage space. The various aspects of the present disclosure may include both the Cloud storage OS 140 and the cloud volume service or either one of them.

As an example, user systems 108 are computing devices that can access storage space at the storage system 120 via the connection system 118 or from the cloud layer 136 presented by the cloud provider 104 or any other entity. The user systems 108 can also access computing resources, as a virtual machine ("VM") (e.g., compute VM 110) via the cloud layer 136. A user may be the entire system of a company, a department, a project unit or any other entity. Each user system is uniquely identified and optionally, may be a part of a logical structure called a storage tenant (not shown). The storage tenant represents a set of users (may also be referred to as storage consumers) for the cloud provider 104 that provides access to cloud-based storage and/or compute resources (e.g., 110) via the cloud layer 136 and/or storage managed by the storage system 120.

In one aspect, host systems 102 are configured to execute a plurality of processor-executable applications 126A-126N (may also be referred to as "application 126" or "applications 126"), for example, a database application, an email server, and others. These applications may be executed in different operating environments, for example, a virtual machine environment, Windows, Solaris, Unix (without derogation of any third-party rights) and others. The applications 126 use storage system 120 or cloud storage 128 to store information at storage devices. Although hosts 102 are shown as stand-alone computing devices, they may be made available from the cloud layer 136 as compute nodes executing applications 126 within VMs (shown as compute VM 110).

Each host system 102 interfaces with a management module 134 of a management system 132 for managing backups, restore, cloning and other operations for the storage system 120. The management module 134 is used for managing and configuring various elements of system 100. Management system 132 may include one or more computing systems for managing and configuring the various elements. Although the management system 132 with the management module 134 is shown as a stand-alone module, it may be implemented with other applications, for example, within a virtual machine environment. Furthermore, the management system 132 and the management module 134 may also be referred to interchangeably throughout this specification.

In one aspect, the storage system 120 provides a set of storage volumes directly to host systems 102 via the connection system 118. In another aspect, the storage volumes are presented by the cloud storage OS 140, and in that context a storage volume is referred to as a cloud volume (e.g., 142). The storage operating system 124/cloud storage OS 140 present or export data stored at storage devices 114/cloud storage 128 as a volume (or a logical unit number (LUN) for storage area network ("SAN") based storage).

The storage operating system 124/cloud storage OS 140 are used to store and manage information at storage devices 114/cloud storage 128 based on a request generated by application 126, user 108 or any other entity. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols for SAN storage, for example, the Small Computer Systems Interface (SCSI) protocol encapsulated over TCP (iSCSI) and SCSI encapsulated over Fibre Channel (FC), object-based protocol or any other protocol.

In a typical mode of operation, one or more input/output (I/O) requests are sent over connection system 118 to the storage system 120 or the cloud storage OS 140, based on the request. Storage system 120/cloud storage OS 140 receives the I/O requests, issues one or more I/O commands to storage devices 114/cloud storage 128 to read or write data on behalf of the host system 102 and issues a response containing the requested data over the network 118 to the respective host system 102.

Although storage system 120 is shown as a stand-alone system, i.e., a non-cluster-based system, in another aspect, storage system 120 may have a distributed architecture; for example, a cluster-based system that may include a separate network module and storage module. Briefly, the network module is used to communicate with host systems 102, while the storage module is used to communicate with the storage devices 114.

Alternatively, storage system 120 may have an integrated architecture, where the network and data components are included within a single chassis. The storage system 120 further may be coupled through a switching fabric to other similar storage systems (not shown) which have their own local storage subsystems. In this way, all the storage subsystems can form a single storage pool, to which any client of any of the storage servers has access.

In one aspect, the storage system 120 (or the cloud storage OS 140) can be organized into any suitable number of virtual servers (may also be referred to as "VServers" or virtual storage machines), in which each VServer represents a single storage system namespace with separate network access. Each VServer has a specific client domain and a security domain that are separate from the client and security domains of other VServers. Moreover, each VServer can span one or more physical nodes, each of which can hold storage associated with one or more VServers. User systems 108/host 102 can access the data on a VServer from any node of the clustered system, through the virtual interface associated with that VServer. It is noteworthy that the aspects described herein are not limited to the use of VServers.

As an example, one or more of the host systems (for example, 102A-102N) or a compute resource (not shown) of the cloud layer 136 may execute a VM environment where a physical resource is time-shared among a plurality of independently operating processor executable VMs (including compute VM 110). Each VM may function as a self-contained platform, running its own operating system (OS) and computer executable, application software. The computer executable instructions running in a VM may also be collectively referred to herein as "guest software." In addition, resources available within the VM may also be referred to herein as "guest resources."

The guest software expects to operate as if it were running on a dedicated computer rather than in a VM. That is, the guest software expects to control various events and have access to hardware resources on a physical computing system (may also be referred to as a host system) which may also be referred to herein as "host hardware resources". The host hardware resource may include one or more processors, resources resident on the processors (e.g., control registers, caches, and others), memory (instructions residing in memory, e.g., descriptor tables), and other resources (e.g., input/output devices, host attached storage, network attached storage or other like storage) that reside in a physical machine or are coupled to the host system.

Figure 3:
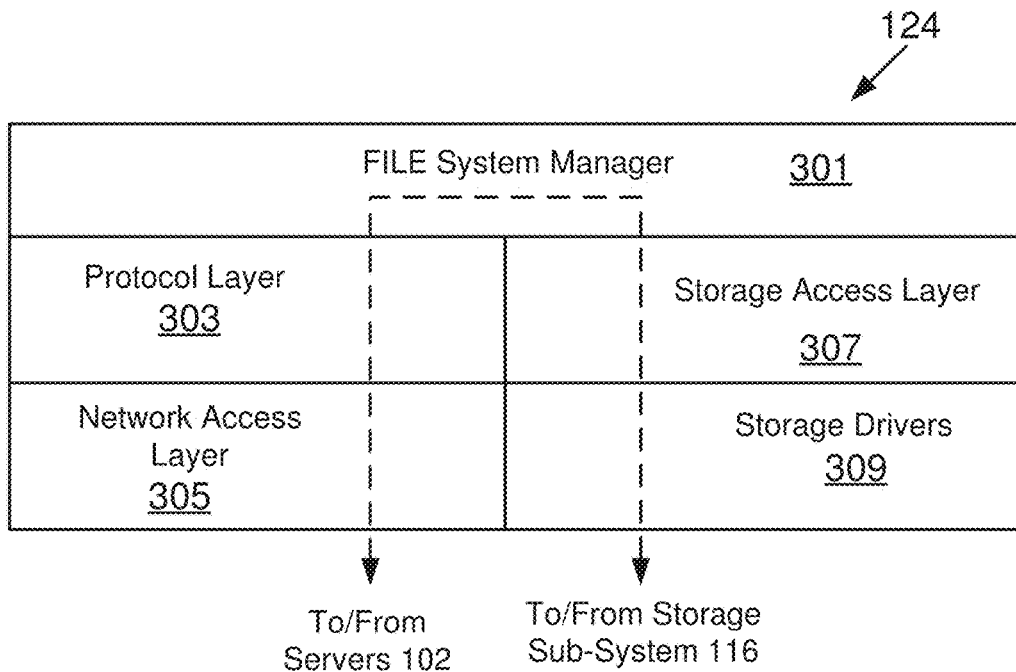
FIG. 3 shows an example of a storage operating system, according to one aspect of the present disclosure.

Storage Operating System: FIG. 3 illustrates a generic example of the storage operating system 124 (or storage operating system instance 36) executed by storage system 120, according to one aspect of the present disclosure. Storage operating system 124/36 interfaces with the storage sub-system 116 as described above in detail.

As an example, operating system 124/36 may include several modules, or "layers". These layers include a file system 301 (similar to 42) that keeps track of a directory structure (hierarchy) of the data stored in storage devices and manages read/write operations, i.e., executes read/write operations on storage devices in response to host system 102 requests.

The storage operating system 124/36 may also include a protocol layer 303 and an associated network access layer 305, to allow storage system 120 to communicate over a network with other systems, such as host system 102, and management system 132. Protocol layer 303 may implement one or more of various higher-level network protocols, such as NFS (e.g., 44, FIG. 2A), CIFS (46, FIG. 2A), S3 (e.g., 48, FIG. 2A), Hypertext Transfer Protocol (HTTP), TCP/IP and others.

Network access layer 305 may include one or more drivers, which implement one or more lower-level protocols to communicate over the network, such as Ethernet. Interactions between host systems 102 and the storage sub-system 116 are illustrated schematically as a path, which illustrates the flow of data through storage operating system 124.

The storage operating system 124 may also include a storage access layer 307 and an associated storage driver layer 309 to communicate with a storage device 14. The storage access layer 307 may implement a higher-level disk storage protocol, such as RAID layer while the storage driver layer 309 may implement a lower-level storage device access protocol, such as the NVMe protocol.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 120.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a disk assembly directly attached to a client or host computer. The term "storage system" should therefore be taken broadly to include such arrangements in addition to any subsystems configured to perform a storage function and associated with other equipment or systems.

Figure 4:
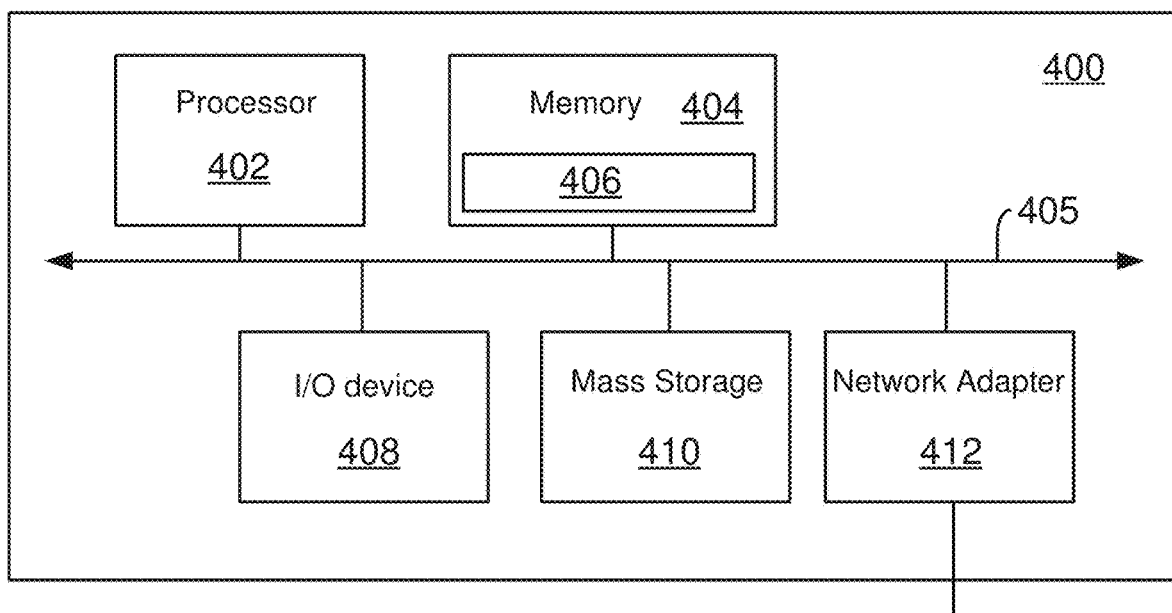
FIG. 4 shows an example of a processing system, used according to one aspect of the present disclosure.

Processing System: FIG. 4 is a high-level block diagram showing an example of the architecture of a processing system, at a high level, in which executable instructions as described above can be implemented. The processing system 400 can represent a compute node 12A/12B, the storage system 120, the management system 132, host systems 102, and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random-access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code for executing the process blocks of FIGS. 2F-2J for using the systems disclosed in FIGS. 1A-2E.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing: The system and techniques described above are applicable and especially useful in the cloud computing environment where storage is presented and shared across different platforms. Cloud computing means computing capability that provides an abstraction between the computing resource and its underlying technical architecture (e.g., servers, storage, networks), enabling convenient, on-demand network access to a shared pool of configurable computing resources that may be rapidly provisioned and released with minimal management effort or service provider interaction. The term "cloud" is intended to refer to a network, for example, the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer is a cloud platform and cloud infrastructure, followed by a "server" layer that includes hardware and computer software designed for cloud specific services. The storage systems described above may be a part of the server layer for providing storage services. Details regarding these layers are not germane to the inventive aspects.

Thus, methods and apparatus for scalable storage appliance have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method executed by one or more processors, comprising:
assigning a first namespace to a second instance of a storage operating system for enabling read and write access to a first portion of a flash storage system by the second instance, wherein the first namespace is used by a first instance of the storage operating system for direct read-only access to the first portion via a direct read path;

assigning a second namespace to the first instance for exclusive read and write access within a second portion of the flash storage system;

generating, by the first instance, a request for the second instance to transfer a data object from the second portion that is owned by the first instance to the first portion;

in response to the request, storing, by the second instance, the data object at the first portion; and updating, by the first instance using the second namespace metadata associated with the data object, the updated metadata stored at the second portion, the updated metadata indicating a storage location at the first portion where the data object is stored, after the transfer.

2. The method of claim 1, further comprising:
utilizing, by the first instance, the updated metadata stored at the second portion to retrieve the data object from the first portion, in response to a read request for the data object received by the first instance.

3. The method of claim 1, further comprising:
identifying, by the first instance, that the data object has become cold and in response, transmitting the request to the second instance.

4. The method of claim 1, wherein updating the metadata of the data object at the second portion comprising:
storing a pointer at the second portion, the pointer pointing to the storage location of the data object at the first portion.

5. The method of claim 1, wherein the first portion comprises of a first type of solid-state drive and the second portion comprises a second type of solid-state drive.

6. The method of claim 5, wherein the first type is a capacity tier with storage performance lower than the second type.

7. The method of claim 1, wherein the first namespace is a zoned namespace for providing shared read-only access to the first instance to the first portion while providing both read and write access to the first portion by the second instance.

8. A non-transitory, machine-readable storage medium having stored thereon instructions comprising machine executable code, which when executed by a machine, causes the machine to:
assign a first namespace to a second instance of a storage operating system for enabling read and write access to a first portion of a flash storage system by the second instance, wherein the first namespace is used by a first instance of the storage operating system for direct read-only access to the first portion via a direct read path;

assign a second namespace to the first instance for exclusive read and write access within a second portion of the flash storage system;

generate, by the first instance, a request for the second instance to transfer a data object from the second portion that is owned by the first instance to the first portion;

in response to the request, store, by the second instance, the data object at the first portion; and update, by the first instance using the second namespace metadata associated with the data object, the updated metadata stored at the second portion, the updated metadata indicating a storage location at the first portion where the data object is stored, after the transfer.

9. The non-transitory, machine readable storage medium of claim 8, wherein the machine executable code further causes the machine to:
utilize, by the first instance, the updated metadata stored at the second portion to retrieve the data object from the first portion, in response to a read request for the data object received by the first instance.

10. The non-transitory, machine readable storage medium of claim 8, wherein the machine executable code further causes the machine to:
identify, by the first instance, that the data object has become cold and in response, transmitting the request to the second instance.

11. The non-transitory, machine readable storage medium of claim 8, wherein the machine executable code further causes the machine to:
store a pointer at the second portion, the pointer pointing to the storage location of the data object at the first portion.

12. The non-transitory, machine readable storage medium of claim 8, wherein the first portion comprises of a first type of solid-state drive and the second portion comprises a second type of solid-state drive.

13. The non-transitory, machine readable storage medium of claim 12, wherein the first type is a capacity tier with storage performance lower than the second type.

14. The non-transitory, machine readable storage medium of claim 8, the first namespace is a zoned namespace for providing shared read-only access to the first instance to the first portion while providing both read and write access to the first portion by the second instance.

15. A system, comprising:
a memory containing machine readable medium comprising machine executable code having stored thereon instructions; and a processor coupled to the memory to execute the machine executable code to:
assign a first namespace to a second instance of a storage operating system for enabling read and write access to a first portion of a flash storage system by the second instance, wherein the first namespace is used by a first instance of the storage operating system for direct read-only access to the first portion via a direct read path;

assign a second namespace to the first instance for exclusive read and write access within a second portion of the flash storage system;

generate, by the first instance, a request for the second instance to transfer a data object from the second portion that is owned by the first instance to the first portion;

in response to the request, store, by the second instance, the data object at the first portion; and update, by the first instance using the second namespace metadata associated with the data object, the updated metadata stored at the second portion, the updated metadata indicating a storage location at the first portion where the data object is stored, after the transfer.

16. The system of claim 15, wherein the machine executable code further causes to:
utilize, by the first instance, the updated metadata stored at the second portion to retrieve the data object from the first portion, in response to a read request for the data object received by the first instance.

17. The system of claim 15, wherein the machine executable code further causes to:

identify, by the first instance, that the data object has become cold and in response, transmitting the request to the second instance.

18. The system of claim 15, wherein the machine executable code further causes to:
store a pointer at the second portion, the pointer pointing to the storage location of the data object at the first portion.

19. The system of claim 15, wherein the first portion comprises of a first type of solid-state drive and the second portion comprises a second type of solid-state drive, the first type is a capacity tier with storage performance lower than the second type.

20. The system of claim 15, wherein the first namespace is a zoned namespace for providing shared read-only access to the first instance to the first portion while providing both read and write access to the first portion by the second instance.

* * * * *